United States Patent
O'Halloran et al.

(10) Patent No.: US 11,379,144 B2
(45) Date of Patent: Jul. 5, 2022

(54) COMPLIANCE OF REPLICATED DATA SETS

(71) Applicant: EMC IP Holding Company LLC, Hopkinton, MA (US)

(72) Inventors: Brian O'Halloran, Carrigaline (IE); Siobhan McLoughlin, Crookstown (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 95 days.

(21) Appl. No.: 17/036,168

(22) Filed: Sep. 29, 2020

(65) Prior Publication Data
US 2022/0100379 A1    Mar. 31, 2022

(51) Int. Cl.
*G06F 12/00*    (2006.01)
*G06F 3/06*    (2006.01)

(52) U.S. Cl.
CPC .............. *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |

*Primary Examiner* — Daniel D Tsui
(74) *Attorney, Agent, or Firm* — Muirhead and Saturnelli, LLC

(57) ABSTRACT

Techniques for determining a compliance level may include: receiving a remote replication policy for a data set; determining a current remote replication configuration of the data set; and performing evaluation processing that determines, in accordance with the remote replication policy for the data set, the compliance level for remote replication of the data set, wherein said evaluation processing includes verifying that the topology of the current remote replication configuration for the data set matches a specified topology of the remote replication policy for the data set.

18 Claims, 14 Drawing Sheets

COMPLIANCE OF REPLICATED DATA SETS

BACKGROUND

Technical Field

This application generally relates to data storage and compliance of replicated data sets.

Description of Related Art

Data storage systems may include resources used by one or more host systems. The data storage systems and the host systems may be interconnected by one or more communication connections such as in a network. The resources may include, for example, data storage devices such as those included in the data storage systems. The data storage systems may be coupled to the one or more host systems where the data storage systems provide storage services to each host system.

The host systems may store data to, retrieve data from, a storage device included in a data storage system containing a plurality of host interface units, physical storage devices or drives, and physical storage interface units. The storage device may be a logical storage device. The host systems access the storage device through a plurality of channels provided therewith. The host systems may perform read and write operations through the channels to the data storage system. The data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Various embodiments of the techniques herein may include a method, a system and a computer readable medium for determining a compliance level comprising: receiving a remote replication policy for a data set; determining a current remote replication configuration of the data set; and performing evaluation processing that determines, in accordance with the remote replication policy for the data set, the compliance level for remote replication of the data set, wherein said evaluation processing includes verifying that the topology of the current remote replication configuration for the data set matches a specified topology of the remote replication policy for the data set. The current remote replication configuration for the data set may include a plurality of hops. Each of the plurality of hops may be between a pair of data storage systems. The evaluation processing may include verifying that each of the plurality of hops is associated with a replication group defining one or more device pairs, wherein a first of the plurality of hops is between a first data storage system and a second data storage system and the first hop is associated with a first replication group including a first plurality of device pairs and each device pair of the first plurality includes a first device on the first data storage system and a second device on the second data storage system, and wherein data of the first device is remotely replicated to the second device.

In at least one embodiment, evaluation processing may include determining that at least one of the plurality of hops is not associated with a replication group; and responsive to determining that at least one of the plurality of hops is not associated with a replication group, assigning the compliance level a value of error denoting a level of non-compliance. The evaluation processing may include checking a plurality of properties of each replication group in the current remote replication configuration of the data set to ensure that the plurality of properties have a plurality of specified values. The plurality of properties of said each replication group may include a first property denoting whether said each replication group is offline, and a second property denoting whether data is currently not being transmitted over one of the plurality of hops associated with said each replication group. The evaluation processing may include determining whether the first property of said each replication group is offline; and responsive to determining the first property of said each replication group is offline, assigning the compliance level the value of error denoting a level of non-compliance.

In at least one embodiment, the evaluation processing may include: determining whether the second property of said each replication group indicates that data is currently not being transmitted over one of the plurality of hops associated with said each replication group; and responsive to determining the second property of said each replication group indicates that data is currently not being transmitted over one of the plurality of hops associated with said each replication group, assigning the compliance level the value of error denoting a level of non-compliance. The plurality of properties may include a third property and the evaluation processing may include: determining whether the third property of said each replication group indicates that said each replication group is currently configured for asynchronous remote replication and determining whether active spillover of replication data is detected for said each replication group; and responsive to determining that the third property of said each replication group indicates said each replication group configured for asynchronous remote replication and that active spillover of replication data is detected for said each replication group, assigning the compliance level a value of warning denoting a level of non-compliance less severe than the value of error.

In at least one embodiment, the plurality of properties of said each replication group may include a fourth property, and wherein said each replication group may be associated with one of the plurality of hops between a first pair of data storage systems, and the evaluation processing may include: determining whether at least the fourth property indicates that two or more ports of each data storage system of the first pair is used to provide remote replication services to said each replication group; and responsive to determining at least the fourth property indicates that two or more ports of each data storage system of the first pair are not used to provide remote replication services to said each replication group, assigning the compliance level the value of warning denoting a level of non-compliance less severe than the value of error. The evaluation processing may include: determining whether the third property of said each replication group indicates that said each replication group is currently configured for asynchronous remote replication and determining whether an observed maximum cycle time for said each replication group exceeds a threshold included in a corresponding remote replication policy associated with said each replication group; and responsive to determining that the third property of said each replication group indicates said each replication group configured for asynchronous remote replication and that the observed maximum cycle time for said each replication group exceeds the threshold included in the corresponding remote replication policy associated with said each replication group, assigning the compliance level the value of warning denoting a level of non-compliance less severe than the value of error.

In at least one embodiment, the evaluation processing may include: determining whether all devices of the data set are remotely replicated; and if all the devices of the data set are not remotely replicated, assigning the compliance level the value of error denoting a level of non-compliance. The evaluation processing may include: determining whether all devices of the data set are included in a same replication group and all devices of the data set are configured to have the same remote replication mode; and responsive to determining that not all the device are included in the same replication group or nor all devices are configured as having the same remote replication mode, assigning the compliance level the value of error denoting a level of non-compliance.

In at least one embodiment, the data set may include a plurality of devices, and the evaluation processing may include: determining whether each device of the data set has a same number of remote replicas at a same set of remote data storage systems; and responsive to determining each device of the data set does not have a same number of remote replicas at a same set of remote data storage systems, assigning the compliance level the value of error denoting a level of non-compliance. The current remote replication configuration of the data set may include a plurality of device replication pairs, wherein each of the device replication pairs includes an R1 device located on a first data storage system and an R2 device located on a second data storage system, and wherein data for remote replication for said each device replication pair may be configured to be transmitted over a first link between the first data storage system and the second data storage system. The evaluation processing may include: updating the compliance level in accordance with a plurality of device replication pair states for the plurality of device replication pairs. For one of the plurality of device replication pairs, data may be transmitted from a source system including the R1 device of said one device replication pair to a target system including the R2 device of said one device replication pair. The R2 device of said one device replication pair may not be synchronized with respect to content on the R1 device of said one device replication pair, and said updating may assign the compliance level the value of warning. The evaluation processing may include: determining that one of the plurality of device replication pairs, that is associated with one replication hop or leg of the current remote replication configuration of the data set, has a first remote replication mode; determining that the remote replication policy specifies that the one replication hop or leg should have a second remote replication mode that is different from the first remote replication mode; and responsive to determining that the remote replication policy specifies that the one replication hop or leg should have the second remote replication mode that is different from the first remote replication mode, assigning the value of warning to the compliance level.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
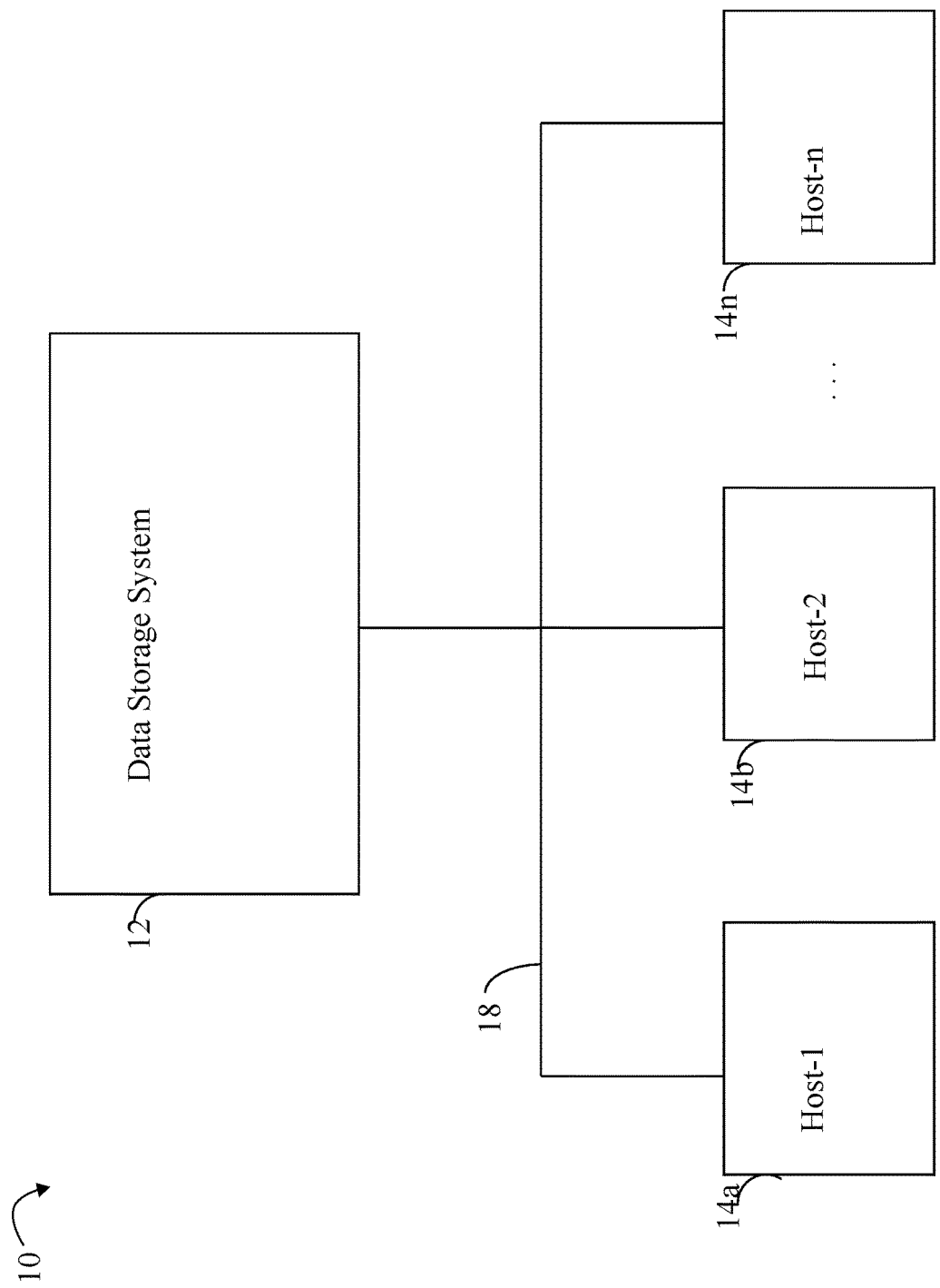
FIG. 1 is an example of an embodiment of components that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, Infiniband (IB), as well as, more generally, any suitable file-based protocol or block-based protocol. Some or all of the connections by which the hosts and the data storage system 12 may be connected to the communication medium 18 may pass through other communication devices and equipment, such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation, such as an I/O operation, resulting in one or more data requests to the data storage system 12. It should be noted that the data storage system 12 of FIG. 1 may physically be a single data storage system, such as a single data storage array, as well one or more other data storage systems as may vary with the embodiment.

Figure 2A:
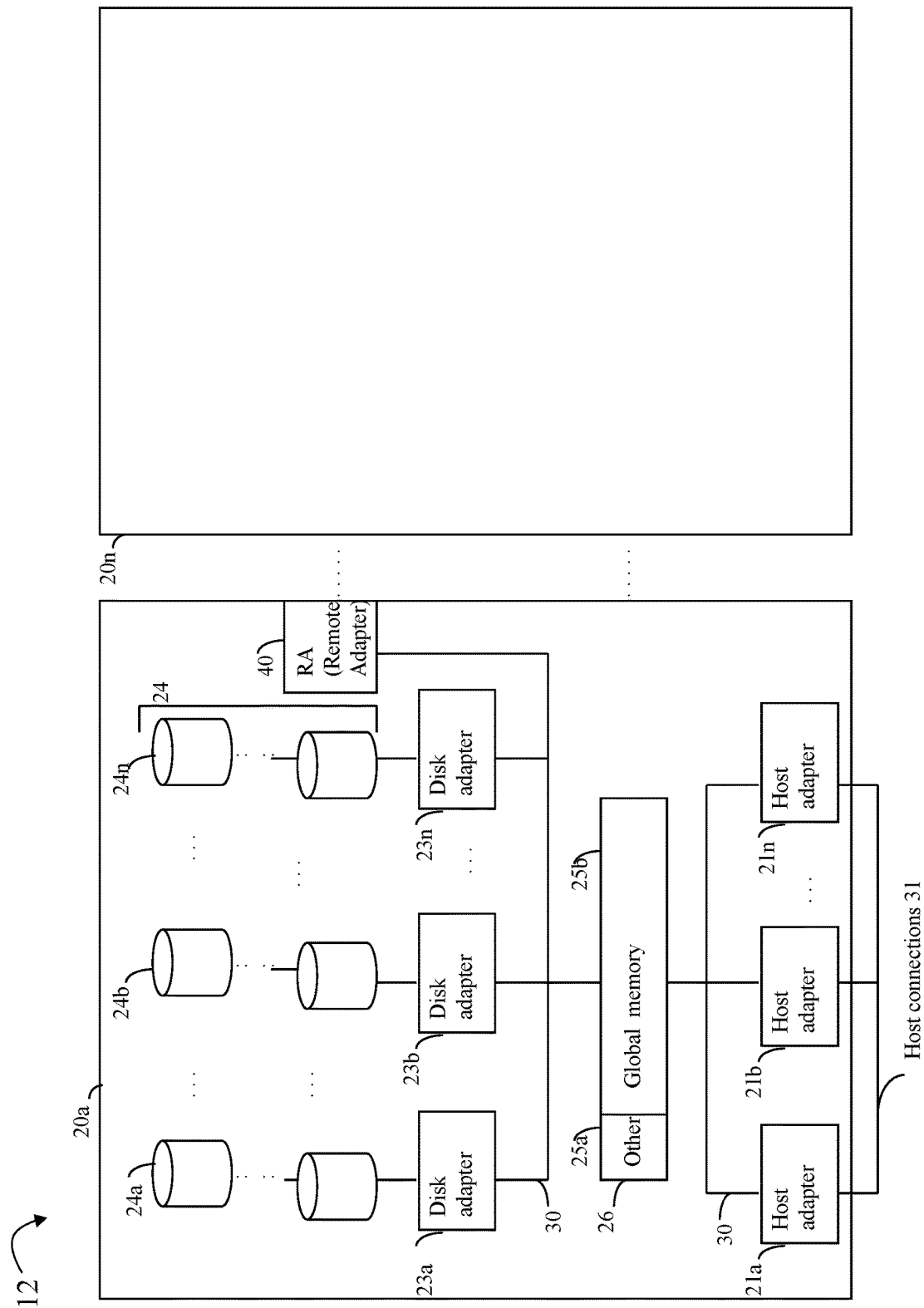
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of the element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the backend physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two data storage systems.

The system 20a may also include one or more host adapters ("HAs") or directors 21a-21n. Each of these HAs may be used to manage communications and data operations between one or more host systems and the global memory 25b. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations, may also be referred to as front end components. A DA may be characterized as a backend component of the data storage system. In connection with the data storage systems, various types of directors or adapters may be implemented as a processor, or, more generally, a component that includes one or more processors or processing cores. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with the techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
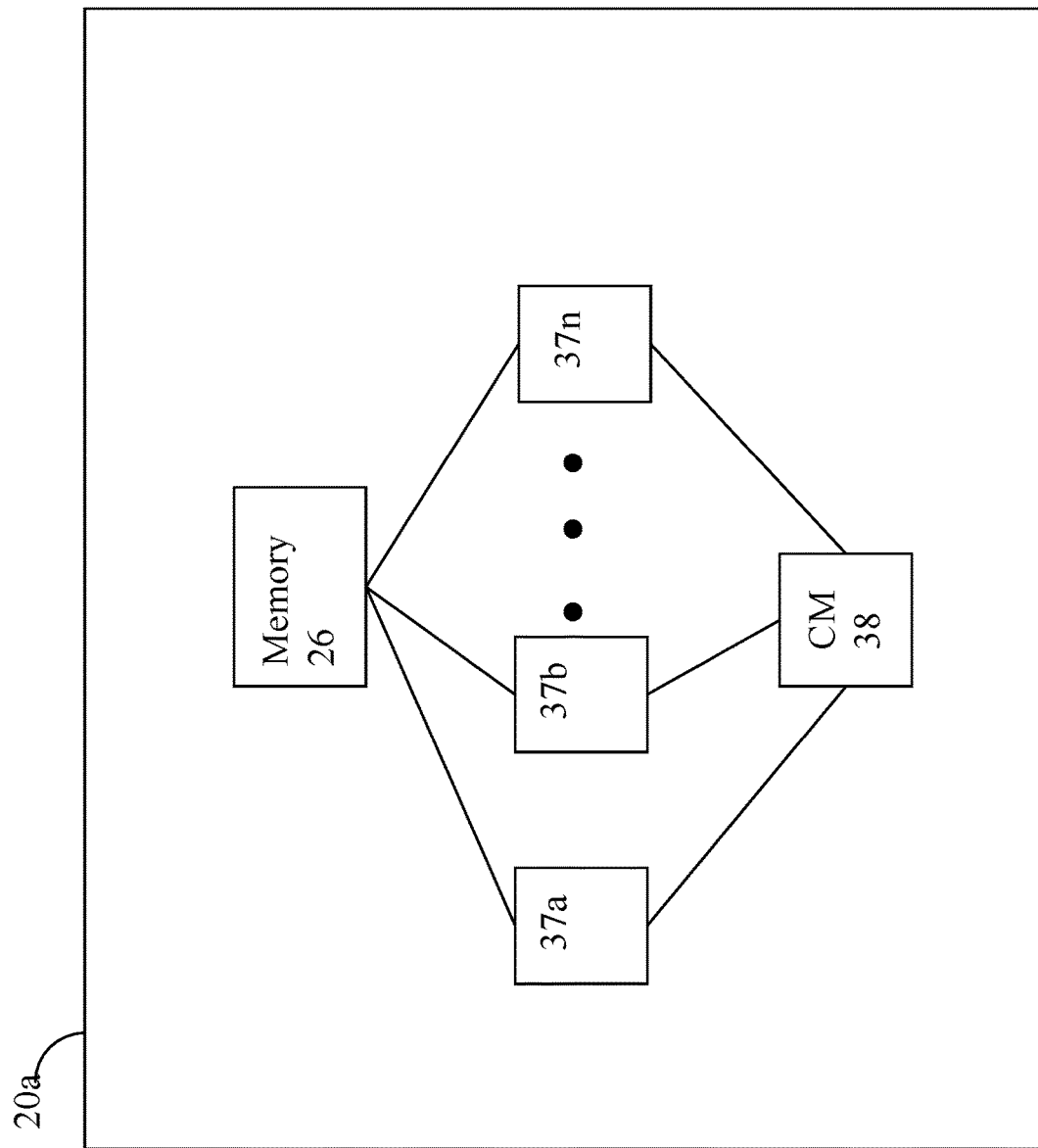
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with the techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with the techniques herein, the data storage system as described may be characterized as having one or more logical mapping layers in which a logical device of the data storage system is exposed to the host, whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, the control commands may be issued from data storage management software executing on a management system or console in communication with the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, a data storage system may have a separate physical connection from the management system or console to the data storage system 12 being managed whereby control commands may be issued over such a physical connection. However, it may be that user I/O commands are never issued over such a physical connection provided solely for purposes of connecting the management system to the data storage system. In any case, the data path and control path each define two separate logical flow paths.

With reference back to FIG. 2A, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet, Fibre Channel, or other suitable transmission channel supporting messaging traffic between data storage systems. The RA may be hardware including a processor used to facilitate communication between data storage systems, such as between two data storage systems. The RA may be used with the Dell EMC™ Symmetrix® Remote Data Facility (SRDF®) products. Dell EMC™ SRDF® is a family of products that facilitates the data replication from one data storage array to another through a Storage Area Network (SAN) or and IP network. Dell EMC™ SRDF® logically pairs a device or a group of devices from each array and replicates data from one data storage system to the other in accordance with a particular replication mode, such as a synchronous or an asynchronous mode described elsewhere herein. Generally, the Dell EMC™ SRDF® products are one example of commercially available products that may be used to provide functionality of a remote data facility (RDF) for use in an embodiment in connection with the techniques herein.

Remote replication is one technique that may be used in connection with providing for disaster recovery (DR) of an application's data set. The application, such as executing on a host, may write to a production or primary data set of one or more LUNs on a primary data storage system. Remote replication, such as using RDF, may be used to remotely replicate the primary data set of LUNs to a second remote data storage system. In the event that the primary data set on the primary data storage system is destroyed or more generally unavailable for use by the application, the replicated copy of the data set on the second remote data storage system may be utilized by the host. For example, the host may directly access the copy of the data set on the second remote system. As an alternative, the primary data set of the primary data storage system may be restored using the replicated copy of the data set, whereby the host may subsequently access the restored data set on the primary data storage system.

Over time, the application's data set of LUNs may be expanded or reduced to accommodate the changing data needs and uses of the application. For example, a LUN may be added to the application data set as the size of the data set increases over time. As another example, an existing LUN of the application data set may be removed, for example, if the data of the existing LUN is no longer used by the application. In order to provide full protection of the application's data set as part of DR, changes to remote replication of the data set of LUNs are also made as the particular LUNs in the data set change over time.

Application data sets may be required to be protected using remote replication. Additionally, various requirements regarding remote replication may be specified in regulations in particular industries. Consistent with discussion herein, remote replication of an application data set provides for one or more remote copies of the application data set in different physical locations. One of the remote copies may be retrieved for various reasons such as, for example, to provide for continued use of the application data set in a DR scenario when the primary or local data set is destroyed or unavailable.

When remotely replicating an application's data set, there is a need to ensure compliance of the remote replication as may be specified in a policy defining the remote replication configuration.

Described in the following paragraphs are techniques that may be used in connection with measurement and reporting of the remote replication compliance of an application's data set. The techniques may include checking various aspects, such as states, properties and attributes, with respect to a currently configured remote replication for an application's data set to determine whether the current remote replication for the data set is compliant with respect to one or more criteria that may be included in a policy (sometimes referred to as a remote replication policy or replication policy) defined for the data set.

In at least one embodiment, the one or more criteria may include a threshold, and compliance checking may include determining whether the current remote replication configuration for the data set meets the specified threshold. Processing may include analyzing the remote replication configuration of the data set, its current state and properties, its associated replication policy, and then determining whether the application data set is in compliance with respect to its associated remote replication policy. The techniques herein may generate a compliance result or output denoting a compliance level. In at least one embodiment, the compliance level may be one of three predefined levels, where the three predefined levels are normal, warning and error. In at least one embodiment, the compliance levels for a data set may be color encoded where green denotes normal, yellow denotes warning and red denotes error. In at least one embodiment, the particular color encoding of the resulting compliance level may be visually presented to a user, such as in a GUI of a management application. In at least one embodiment, a compliance level other than normal or green may denote a level of non compliance with respect to the remote replication policy associated with the data set. An embodiment may have different levels of severity or degrees of non-compliance. For example, the warning or yellow level may denote a minor level of non-compliance and the error or warning level may denote a more sever level of non-compliance.

The foregoing and other details of the techniques herein providing for evaluating the compliance of remotely replicated data sets are described in following paragraphs.

Prior to discussing the techniques herein that provide for evaluating the compliance of remotely replicated data sets, the following paragraphs initially provide a more detailed description of a RDF that may be used to automatically perform remote data replication in an embodiment in accordance with the techniques herein. Additionally, the following paragraphs also provide some example remote replication configurations that may be used in an embodiment in accordance with the techniques herein.

Figure 3:
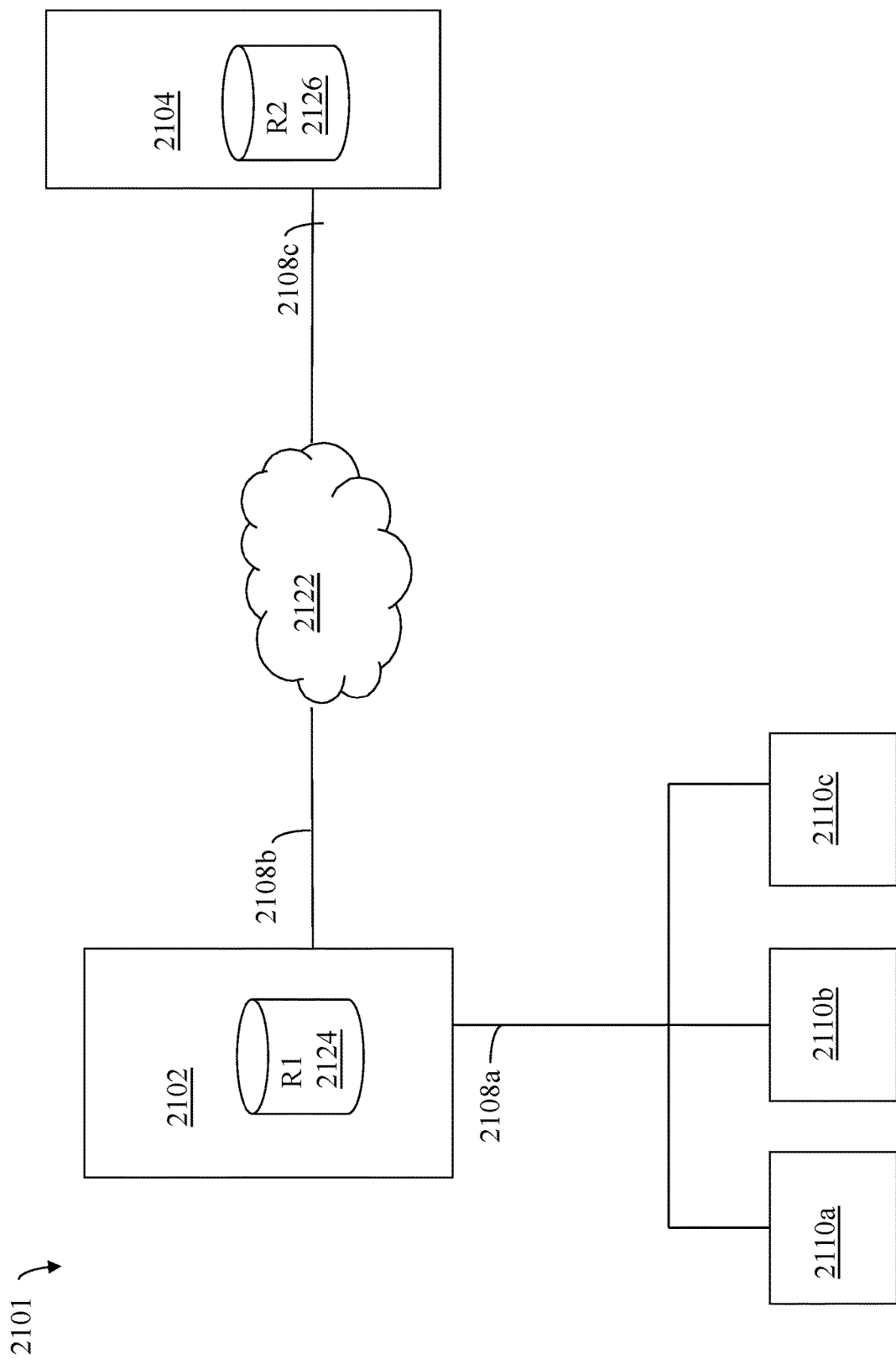
FIGS. 3, 4, 5, 6, 7 and 8 are examples of various replication configurations that may be used in an embodiment in accordance with the techniques herein.

Referring to FIG. 3, shown is an example of an embodiment of a system 2101 that may be used in connection with the techniques described herein. It should be noted that the embodiment illustrated in FIG. 3 presents a simplified view of some of the components illustrated in FIGS. 1 and 2A, for example, including only some detail of the data storage systems 12 for the sake of illustration.

Included in the example 2101 are the data storage systems 2102 and 2104; and the hosts 2110a, 2110b and 1210c. The data storage systems 2102, 2104 may be remotely connected and communicate over the network 2122, such as the Internet or other private network, and facilitate communications with the components connected thereto. The hosts 2110a, 2110b and 2110c may perform operations to the data storage system 2102 over the connection 2108a. The hosts 2110a, 2110b and 2110c may be connected to the data storage system 2102 through the connection 2108a which may be, for example, a network or other type of communication connection. Although not illustrated, the hosts 2110a-2110c may also be directly connected to a network such as the Internet.

The data storage systems 2102 and 2104 may include one or more devices. In this example, the data storage system 2102 includes the storage device R1 2124, and the data storage system 104 includes the storage device R2 2126. Both of the data storage systems may include one or more other logical and/or physical devices. The data storage system 2102 may be characterized as local with respect to the hosts 2110a, 2110b and 2110c. The data storage system 104 may be characterized as remote with respect to the hosts 2110a, 2110b and 2110c. The R1 and R2 devices may be configured as LUNs.

The host 1210a may issue a command, such as to write data to the device R1 of the data storage system 2102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the Dell EMC™ SRDF® products. Communication between the data storage systems providing remote replication using Dell EMC™ SRDF® is described, for example, in U.S. Pat. Nos. 5,742,792, 5,544, 347, and 7,054,883, all of which are incorporated by reference herein. With Dell EMC™ SRDF®, a user may denote a first storage device, such as R1, as a primary storage device and a second storage device, such as R2, as a secondary storage device. Other incarnations of Dell EMC™ SRDF® may provide a peer to peer relationship between the local and remote storage devices. In this example, the host 2110a interacts directly with the device R1 of the data storage system 2102, and any data changes made are automatically provided to the R2 device of the data storage system 2104 using Dell EMC™ SRDF®. In operation, the host 110a may read and write data using the R1 volume in 2102, and Dell EMC™ SRDF® may handle the automatic copying and updating of data from R1 to R2 in the data storage system 2104.

As illustrated in connection with other figures herein, the data storage system 2102 may have one or more RAs included therein to facilitate remote connections to the data storage system 2104. Communications between the storage systems 2102 and 2104 may be made over connections 2108b, 2108c to the network 2122. The data storage system 2104 may include one or more RAs for use in receiving the communications from the data storage system 2102. The data storage systems may communicate, for example, over Gigabit Ethernet connections supporting TCP/IP traffic. The Dell EMC™ SRDF® replication functionality may be facilitated with the RAs provided at each of the data storage systems 2102 and 2104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with Dell EMC™ SRDF®, a single RDF link, connection or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment may also include the concept of a remote data facility (RDF) group (also referred to as a replication group) of devices (e.g., LUNs). Rather than have a single R1 device and a single R2 device, a replication group may be defined includes a source group of devices, such as devices of the data storage system 2102, and includes a corresponding target group of devices, such as devices on data storage system 2104. The devices in the source group may be mirrored in corresponding devices of the target group using Dell EMC™ SRDF® functionality.

In at least one embodiment, storage groups (SGs) may be supported. A SG may be a logically defined group of one or more LUNs, or more generally devices, in a data storage system. In connection with RDF, a source SG may be defined on the primary or R1 data storage system where the source SG includes one or more LUNs used by an application. The source SG may include the R1 devices of the R1-R2 device pairings used in connection with RDF. A target SG may be defined on the secondary or R2 data storage system where the target SG includes a corresponding replica or copy for each LUN in the source SG. Each LUN in the source SG is uniquely paired with a corresponding LUN in the target SG, where the corresponding LUN is a replica of associated LUN from the source SG. The target SG may include the R2 devices of the R1-R2 RDF device pairings used in connection with RDF. Collectively, the R1-R2 RDF device pairs represented by the source SG and its corresponding target SG of device replicas may be referred to as a replication group. To further illustrate, assume the source SG includes LUN A1 and LUN B1 and the target SG includes LUN A2 and LUN B2, where LUN A1 and LUN A2 are configured as a first RDF device pairing (e.g., LUN A1 is the R1 device of the first RDF pairing and LUN A2 is the R2 device of the first RDF pairing), and where LUN B1 and LUN B2 are configured as a second RDF pairing (e.g., LUN B1 is the R1 device of the RDF pairing and LUN B2 is the R2 device of the second RDF pairing).

In at least one embodiment, LUNs may not be accessible or exposed to a host or other client until the LUN is included in a particular SG. In such an embodiment, access controls may be used to selectively allow access to the LUNs of the SG. For example, a first host may be permitted to access LUNs of a first SG but not LUNs of a second different SG. In this manner, the data storage system may, for example, selectively expose LUNs of a first set of SGs to a first set of hosts and also not allow other hosts to access of the first set SGs of LUNs.

Discussion herein may refer to examples using an RDF device pairing with a single R1 device paired with a single R2 device. However, more generally, the same concepts described herein with respect to a single RDF device pairing also applies to the multiple RDF device pairings of a replication group.

The techniques herein may be used with Dell EMC™ SRDF®, or more generally any RDF, operating in one or more different supported replication modes. For example, such modes may include Dell EMC™ SRDF® operating in synchronous mode, asynchronous mode, adaptive copy mode, and possibly other supported modes some of which are described herein. Generally, the different replication modes address different service level requirements and determine, for example, how R1 devices are remotely mirrored across the replication links, how I/Os are processed, when the host receives acknowledgment of a write operation relative to when the write is replicated, and when writes or updates are sent to R2 partner devices.

In at least one embodiment, a primary replication mode may be configured for each RDF device pairing where the primary mode may be synchronous, asynchronous or possibly another supported replication mode. In addition to have an associated primary replication mode, an RDF device pairing may also be configured to have a secondary mode of adaptive copy. Adaptive copy mode moves large amounts of data quickly with minimal host impact. Adaptive copy mode does not provide restartable data images at the secondary site until no new writes are sent to the R1 device and all data has finished copying to the R2. Adaptive copy mode may be specified for a new RDF pairing, for example, as one way to synchronize the data of the R2 device with the data of the R1 device, or to migrate data of the R1 device to its corresponding R2 device in another system. When the synchronization or migration is complete, the mode of the RDF pairing reverts to the configured primary replication mode, such as synchronous or asynchronous. In at least one embodiment, adaptive copy may be specified as the secondary mode for an RDF device pairing until the R1 and R2 devices of the pairing are synchronized. Once synchronized, the RDF device pairing may revert from the second mode to the configured primary mode. In at least one embodiment in connection with R1-R2 device synchronization, a maximum skew or difference may be specified indicating, for example, a number of data tracks or data portions that are not yet copied or synchronized from the R1 to the R2 device. The maximum number of tracks that the R2 can be out of synchronization with adaptive copy mode may be a default value that is equal to the entire logical device.

For the RDF device pairing in the adaptive copy mode, if the maximum skew value is exceeded, RDF starts the synchronization process to transfer updates from the R1 to the R2 devices. When the adaptive copy mode is specified as a secondary replication mode for an RDF device pairing having a primary replication mode of synchronous, the R1 device reverts to the synchronous replication mode for data transfer when the maximum skew value is reached and remains in the synchronous replication mode until the number of tracks out of synchronization is lower than the maximum skew.

To further illustrate primary replication modes in connection with Dell EMC™ SRDF®, the host may issue a write to an R1 device in a first data storage system and the data change is propagated to the R2 device in a second data storage system. As discussed in U.S. Pat. No. 5,544,347, Dell EMC™ SRDF® can be operated in either a synchronous mode or an asynchronous mode. When operating in the synchronous mode, the host does not consider a write I/O operation to be complete until the write I/O has been completed on both the first and second data storage systems. Thus, in synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 2102, 2104, it may be desirable to operate in a mode such as asynchronous to avoid host timeouts while the host awaits acknowledgement regarding completion of a host I/O.

Remote data replication may be performed in a synchronous manner or mode, such as using Dell EMC™ SRDF® operating in a synchronous mode (Dell EMC™ SRDF®/S). With synchronous mode remote data replication, a host 2110a may issue a write to the R1 device 2124. The primary or R1 data storage system 2102 may store the write data in its cache at a cache location and mark the cache location as including write pending (WP) data as mentioned elsewhere herein. The remote data replication facility operating in the synchronous mode, such as Dell EMC™ SRDF®/S, may propagate the write data across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

When operating in asynchronous mode when processing a received write I/O operation from a host as noted above, the primary or R1 data storage system 2102 may store the write data in its cache at a cache location and mark the cache location as including WP data as mentioned elsewhere herein. The write data may be propagated across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. With asynchronous mode, once the write data is stored in the cache of the local or R1 system 2102 and marked as WP, an acknowledgement regarding completion of the host write may be sent to the host 2110a by the system 2102. Thus, in asynchronous mode the system 2102 is not required to wait to receive the acknowledgement from the R2 data storage system 2104 prior to sending the acknowledgement to the host regarding completion of the write operation. In at least one embodiment, asynchronous replication such as with respect to a defined R1-R2 device pairing places the host writes to the R1 device into 'cycles' or 'chunks' and then transfers an entire chunk of writes to the target system for storing in the paired R2 device.

When initially commencing remote replication for an RDF device pairing having an associated primary replication mode of synchronous or asynchronous, the RDF device pairing may be configured in adaptive copy mode in order to initially synchronize the R1-R2 devices. Subsequent to synchronizing the data of the paired R1 and R2 devices, the mode may revert to the configured primary replication of synchronous or asynchronous.

Figure 4:
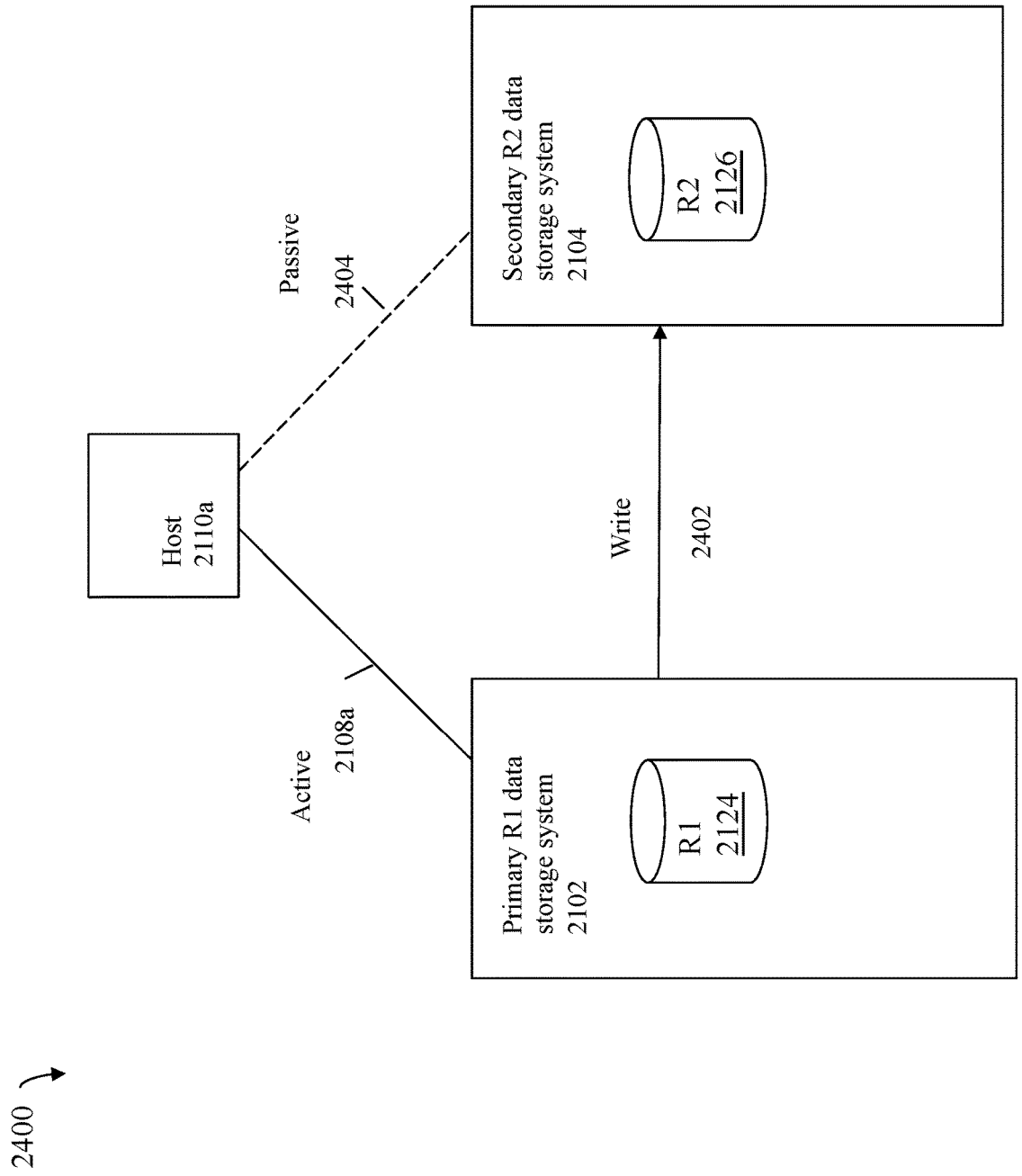

With reference to FIG. 4, shown is a further simplified illustration of components that may be used in an embodiment in accordance with the techniques herein. The example 2400 is simplified illustration of components as described in connection with FIG. 2. Element 2402 generally represents the replication link used in connection with sending write data from the primary R1 data storage system 2102 to the secondary R2 data storage system 2104. Link 2402, more generally, may also be used in connection with other information and communications exchanged between 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 may also be referred to herein as an active-passive configuration such as may be used with synchronous replication and other supported replication modes where the host 2110a has an active connection or path 2108a over which all I/Os are issued to only the R1 data storage system. The host 2110a may have a passive connection or path 2404 to the R2 data storage system 2104. In the configuration of 2400, the R1 device 2124 and R2 device 2126 may be configured and identified as the same LUN, such as LUN A, to the host 2110a. Thus, the host 2110a may view 2108a and 2404 as two paths to the same LUN A where path 2108a is active (over which I/Os may be issued to LUN A) and where path 2404 is passive (over which no I/Os to the LUN A may be issued). For example, the devices 2124 and 2126 may be configured to have the same logical device identifier such as the same world wide name or identifier as well as having other attributes or properties that are the same. Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

It should be noted although only a single RDF link 2402 is illustrated, more generally any number of RDF links may be used in connection with replicating data from systems 2102 to system 2104 in connection with techniques herein.

Consistent with discussion herein, rather than have a single RDF device pairing of R1 2124 and R2 2126 in a replication group in connection with FIG. 4, multiple RDF device pairings may be defined and included in the same replication group.

Figure 5:
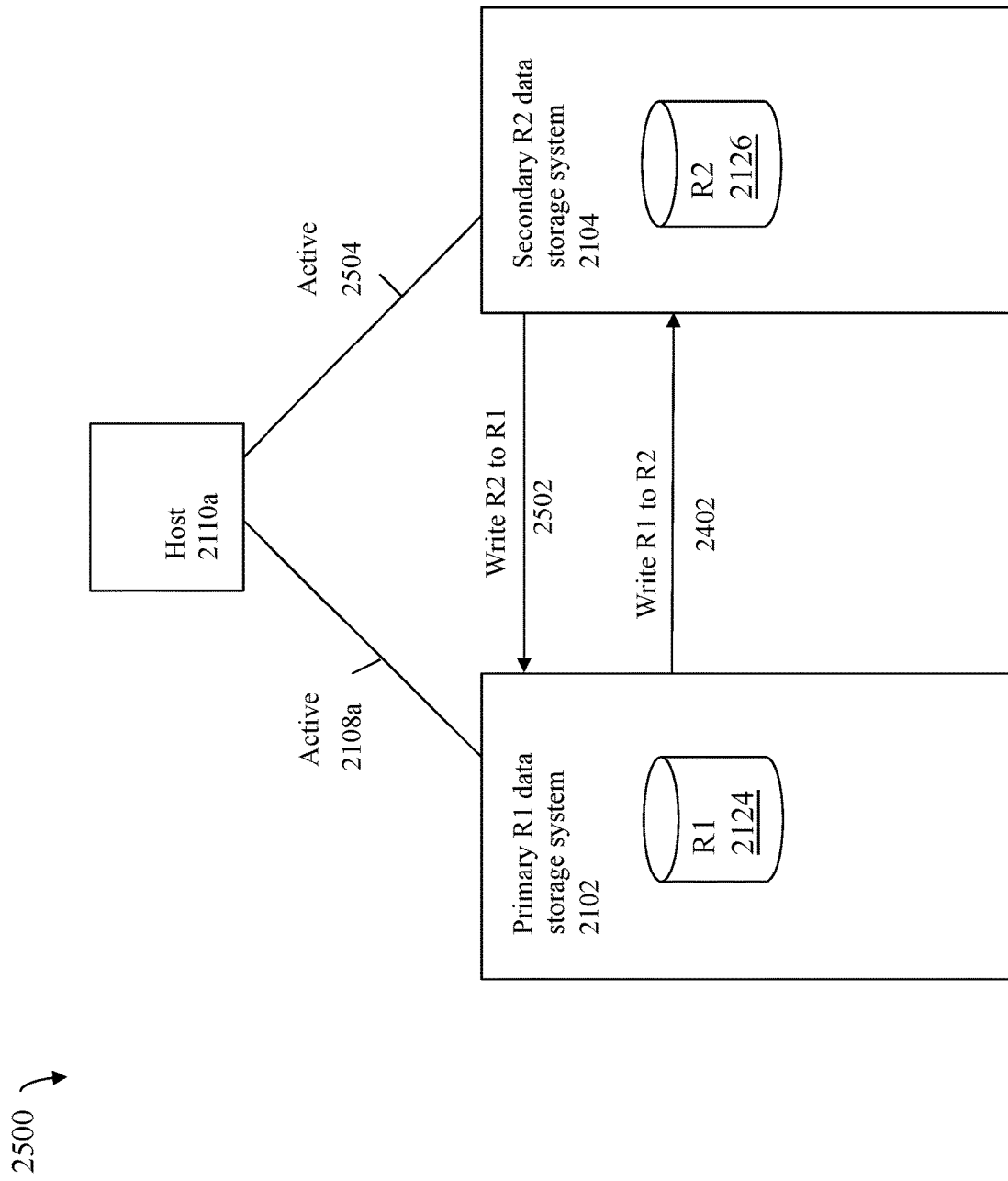

Referring to FIG. 5, shown is another example configuration of components that may be used in an embodiment in accordance with the techniques herein. The example 2500 illustrates an active-active configuration as may be used in connection with synchronous replication in at least one embodiment in accordance with the techniques herein. In an active-active configuration with synchronous replication, the host 2110a may have a first active path 2108a to the R1 data storage system and R1 device 2124 configured as LUN A. Additionally, the host 2110a may have a second active path 2504 to the R2 data storage system and R2 device 2126 configured as LUN A. From the view of the host 2110a, paths 2108a and 2504 appear as 2 paths to the same LUN A as described in connection with FIG. 4 with the difference that the host in the example 2500 configuration may issue I/Os, both reads and/or writes, over both of paths 2108a and 2504. The host 2110a may send a first write over path 2108a which is received by the R1 system 2102 and written to cache of the R1 system 2102 where, at a later point in time, the first write is destaged from the cache of the R1 system 2102 to physical storage provisioned for the R1 device 2124 configured as LUN A. The R1 system 2102 also sends the first write to the R2 system 2104 over link 2402 where the first write is written to cache of the R2 system 2104, where, at a later point in time, the first write is destaged from the cache of the R2 system 2104 to physical storage provisioned for the R2 device 2126 configured as LUN A. Once the first write is written to the cache of the R2 system 2104, the R2 system 2104 sends an acknowledgement over link 2402 to the R1 system 2102 that it has completed the first write. The R1 system 2102 receives the acknowledgement from the R2 system 2104 and then returns an acknowledgement to host 2110a over path 2108a that the first write has completed.

The host 2110a may also send a second write over path 2504 which is received by the R2 system 2104 and written to cache of the R2 system 2104 where, at a later point in time, the second write is destaged from the cache of the R2 system 2104 to physical storage provisioned for the R2 device 2126 configured as LUN A. The R2 system 2104 also sends the second write to the R1 system 2102 over a second link 2502 where the second write is written to cache of the R1 system 2102, and where, at a later point in time, the second write is destaged from the cache of the R1 system 2102 to physical storage provisioned for the R1 device 2124 configured as LUN A. Once the second write is written to the cache of the R1 system 2102, the R1 system 2102 sends an acknowledgement over link 2502 to the R2 system 2104 that it has completed the second write. Once the R2 system 2104 receives the acknowledgement from the R1 system (regarding completion of the second write), the R2 system 2104 then returns an acknowledgement to host 2110a over path 2504 that the second write has completed.

Thus, in the example 2500, the illustrated active-active configuration includes a first RDF R1-R2 device pairing configured for synchronous replication (from 2102 to 2104) where the R1 device is 2124 and the R2 device is 2126 whereby writes to LUN A sent over 2108a to system 2102 are stored on the R1 device 2124 and also transmitted to system 2104 over 2402. The write sent over 2402 to system 2104 is stored on the R2 device 2126. Such replication is performed synchronously in that the acknowledgement to the host write sent over 2108a is not acknowledged as successfully completed unless and until the write data has been stored in caches of systems 2102 and 2104.

In a similar manner, the illustrated active-active configuration of the example 2500 includes a second RDF R1-R2 device pairing configured for synchronous replication (from 2104 to 2102) where the R1 device is 2126 and the R2 device is 2124 whereby writes to LUN A sent over 2504 to system 2104 are stored on the device 2126 (now acting as the R1 device of the second RDF device pairing) and also transmitted to system 2102 over connection 2502. The write sent over 2502 is stored on the R2 device 2124. Such replication is performed synchronously in that the acknowledgement to the host write sent over 2504 is not acknowledged as successfully completed unless and until the write data has been stored in caches of systems 2102 and 2104.

Effectively, using the second RDF device pairing in the active-active configuration with synchronous replication as in FIG. 5 has the R2 system 2104 act as another primary data storage system which facilitates propagation of writes received at the data storage system 2104 to the data storage system 2102. It should be noted that although FIG. 5 illustrates for simplicity a single host accessing both the R1 device 2124 and R2 device 2126, any number of hosts may access one or both of the R1 device 2124 and the R2 device 2126.

Although only a single RDF link 2402 is illustrated in connection with replicating data from systems 2102 to system 2104 in connection with techniques herein, more generally any number of RDF links may be used. Although only a single RDF link 2502 is illustrated in connection with replicating data from systems 2104 to system 2102, more generally any number of RDF links may be used. Furthermore, although 2 RDF links 2402 and 2502 are illustrated, in at least one embodiment, a single RDF link may be used in connection with sending data from system 2102 to 2104, and also from 2104 to 2102.

In at least one embodiment in accordance with the techniques herein, the Fibre Channel (FC) protocol may be used in connection with communications (e.g., over the SAN including the RDF links) between the data storage system 2102 and 2104.

Consistent with discussion herein, rather than have a single RDF device pairing of R1 2124 and R2 2126 in a first replication group in the FIG. 5, multiple RDF device pairings may be defined and included in the same first replication group. Also rather than have a single RDF device pairing in a second replication group where the device 2126 acts as the primary or R1 device and the device 2124 acts as the secondary or R2 device for facilitating replication of writes such as denoted by 2502, multiple RDF device pairings may be defined and included in the same second replication group.

In at least one embodiment, the active-active remote replication configuration of FIG. 5, where the R1 device 2124 and the R2 device 2126 are configured as the same LUN or logical device from the host 2110, may be exposed to a user as having an active replication mode. Thus in at least one embodiment, supported and defined replication modes may include synchronous, asynchronous, adaptive copy and active. The active replication mode may be implemented as illustrated in the FIG. 5 using the two way configured synchronous remote replication.

Figure 6:
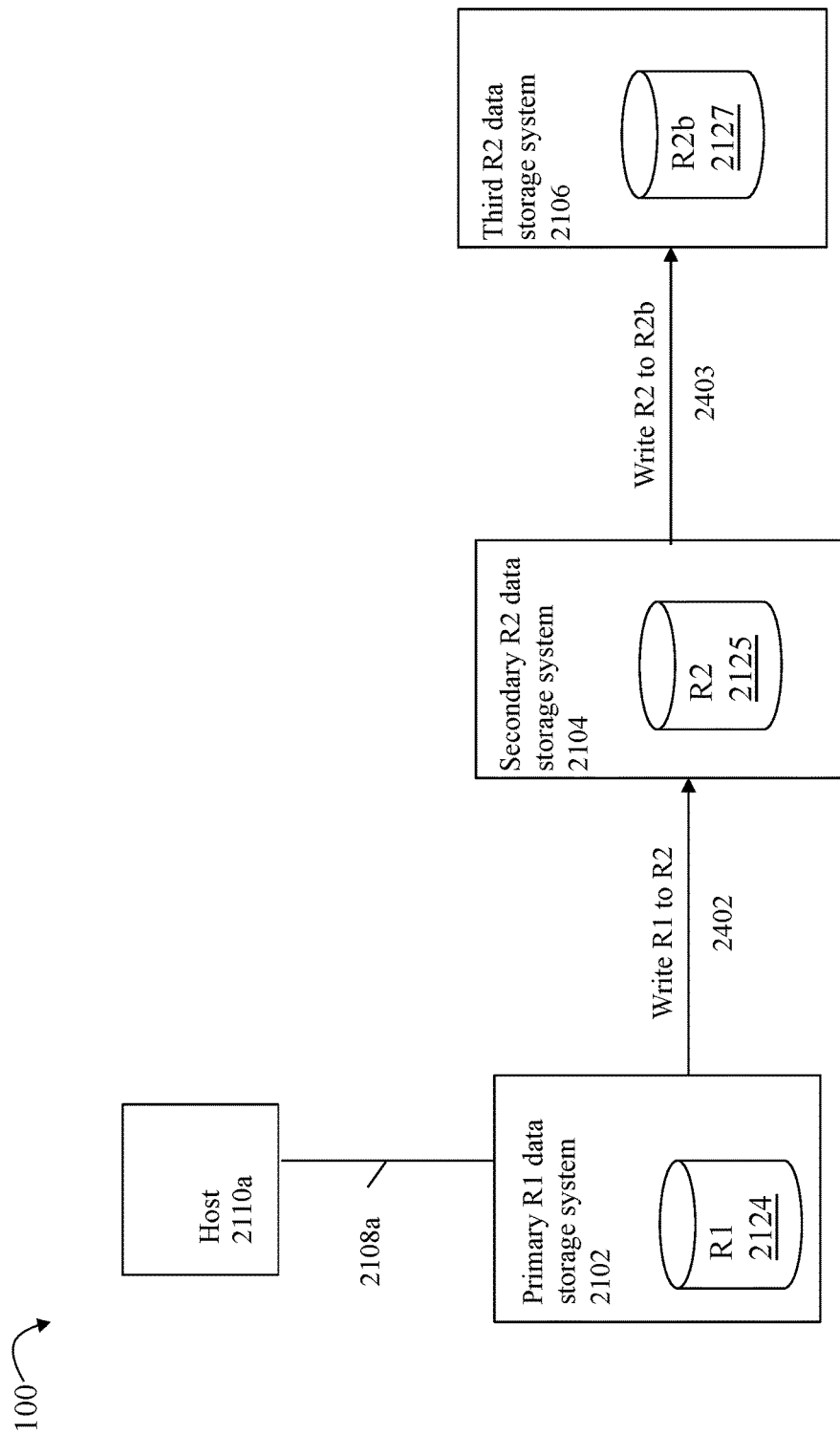

Referring to FIG. 6, shown is an example 100 of a cascaded arrangement of data storage systems used in connection with remote replication in an embodiment in accordance with the techniques herein. The example 100 includes the host 2110a, the data storage systems 2102, 2104, and the connections or links 2108a, 2402 as described above. A first RDF device pairing may be defined to include R1 2124 and R2 2125. Additionally, this example 100 includes a third R2 data storage system 2106 and a third device R2b 2127. The example 100 also includes a second RDF device pairing defined to include the devices R2 2125 and R2b 2127 where writes to the device R2 2125 are automatically replicated over the RDF link 2403 to the device R2b 2127.

The arrangement of FIG. 6 illustrates 3 sites or data storage systems involving 2 legs or hops between data storage systems, where data of the device R1 2124 is automatically replicated to the device R2 2125, and whereby data of the device R2 2125 is also automatically replicated to the device R2b 2127. More generally, the cascaded arrangement may include more than 3 data storage systems forming a chain in which data writes are cascaded or propagated from the first data storage system in the chain (e.g., 2102) to the last data storage system in the chain (e.g., 2106). RDF device pairings may be defined between each pair of consecutive data storage systems of the chain in order to facilitate automatically replicating data through the chain of data storage systems and devices.

The configured replication mode for each of the RDF device pairings may vary depending on embodiment. For example, in at least one embodiment in connection with FIG. 6, the first RDF device pairing of R1 2124 and R2 2125 may be configured for synchronous replication, and the second RDF device pairing of R2 2125 and R2b 2127 may be configured for asynchronous replication. As a variation, both RDF device pairings may be configured for the same replication mode, such as both configured for synchronous replication or asynchronous replication. Other variations are possible depending on the supported modes and embodiment.

Consistent with discussion herein, rather than have a single RDF device pairing of R1 2124 and R2 2125 in a first replication group in the FIG. 6, multiple RDF device pairings may be defined and included in the same first replication group. Also rather than have a single RDF device pairing of R2 2125 and R2b 2127 in a second replication group 2, multiple RDF device pairings may be defined and included in the same second replication group.

Figure 7:
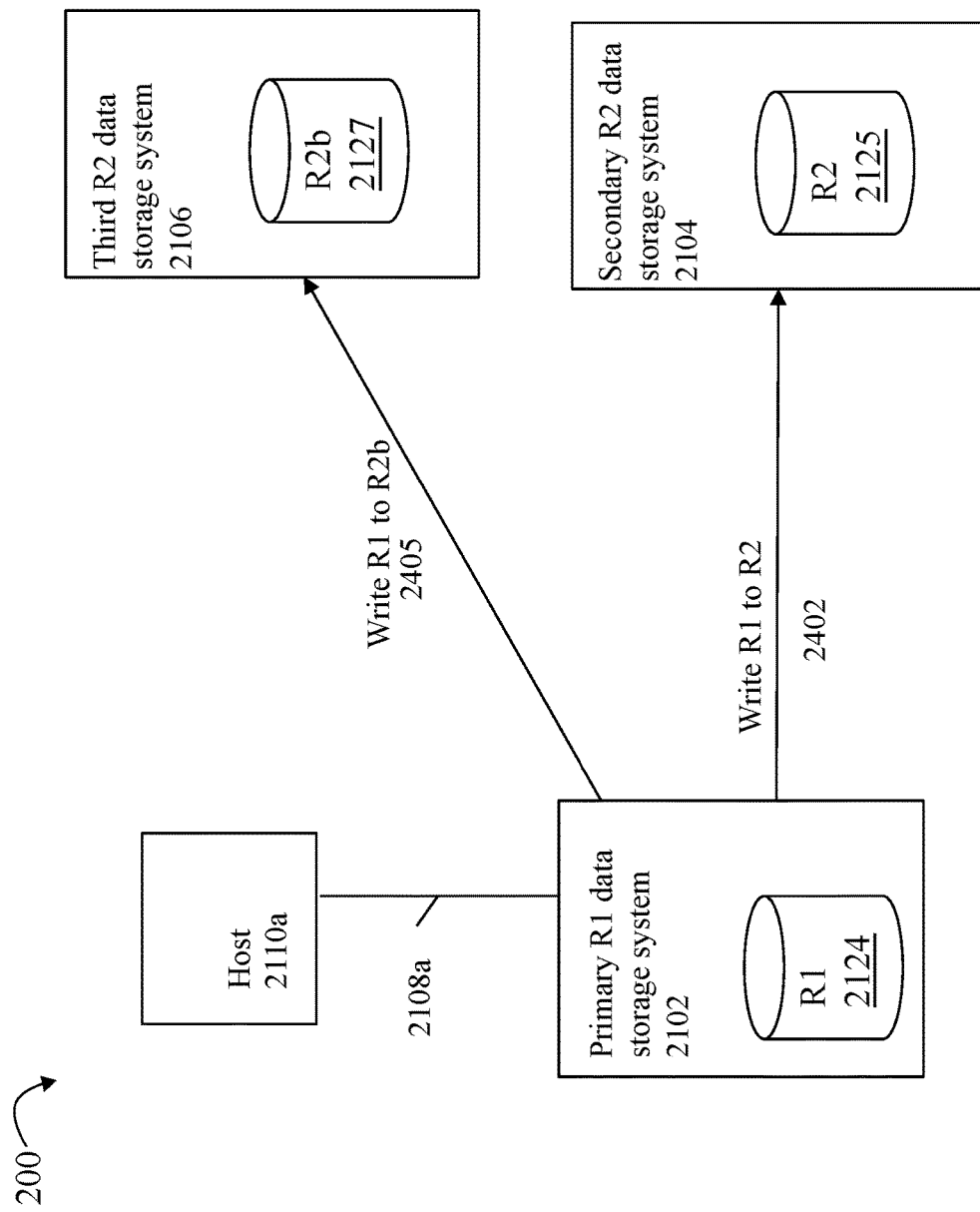

Referring to FIG. 7, shown is an example 200 of a concurrent arrangement of data storage systems used in connection with remote replication in an embodiment in accordance with the techniques herein. The example 200 illustrates another three-site or data storage system disaster recovery solution involving 2 legs or hops between systems where the device R1 2124 of the R1 system 2102 is mirrored concurrently to the two devices R2b 2127 and R2 2125.

The example 200 includes the host 2110a, the data storage systems 2102, 2104, and the connections or links 2108a, 2402 as described above. A first RDF device pairing may be defined to include R1 2124 and R2 2125 as described above. Additionally, this example 100 includes a third R2 data storage system 2106 and a third device R2b 2127. The example 200 also includes a second RDF device pairing defined to include the devices R1 2124 and R2b 2127 where writes to the device R1 2124 are automatically replicated over the RDF link 2405 to the device R2b 2127.

The arrangement of FIG. 7 illustrates 3 sites or data storage systems where data of the device R1 2124 is automatically replicated concurrently to both the devices R2 2125 and R2b 2127 on the 2 legs or hops. More generally, the arrangement may include more than 3 data storage systems where data of the primary R1 device 2124 is replicated to more than two R2 devices, with an RDF device pairing defined between the R1 device 2124 and each of the R2 devices. The R2 devices may each be in a different data storage system. More generally, a single data storage system may include any number of the R2 devices. For example, the devices R2 2125 and R2b 2127 may both be in the same single data storage system.

Consistent with discussion herein, rather than have a single RDF device pairing of R1 2124 and R2 2125 in a first replication group in the FIG. 7, multiple RDF device pairings may be defined and included in the same first replication group. Also rather than have a single RDF device pairing of R1 2124 and R2b 2127 in a second replication group 2, multiple RDF device pairings may be defined and included in the same second replication group.

The configured replication mode for each of the RDF device pairings may vary depending on embodiment. For example, in at least one embodiment, the first RDF device pairing of R1 2124 and R2 2125 of the FIG. 7 may be configured for synchronous replication, and the second RDF device pairing of R1 2124 and R2b 2127 may be configured for asynchronous replication. As a variation, both RDF device pairings may be configured for the same replication mode, such as both configured for synchronous replication or asynchronous replication. Other variations are possible depending on the supported modes and embodiment.

Figure 8:
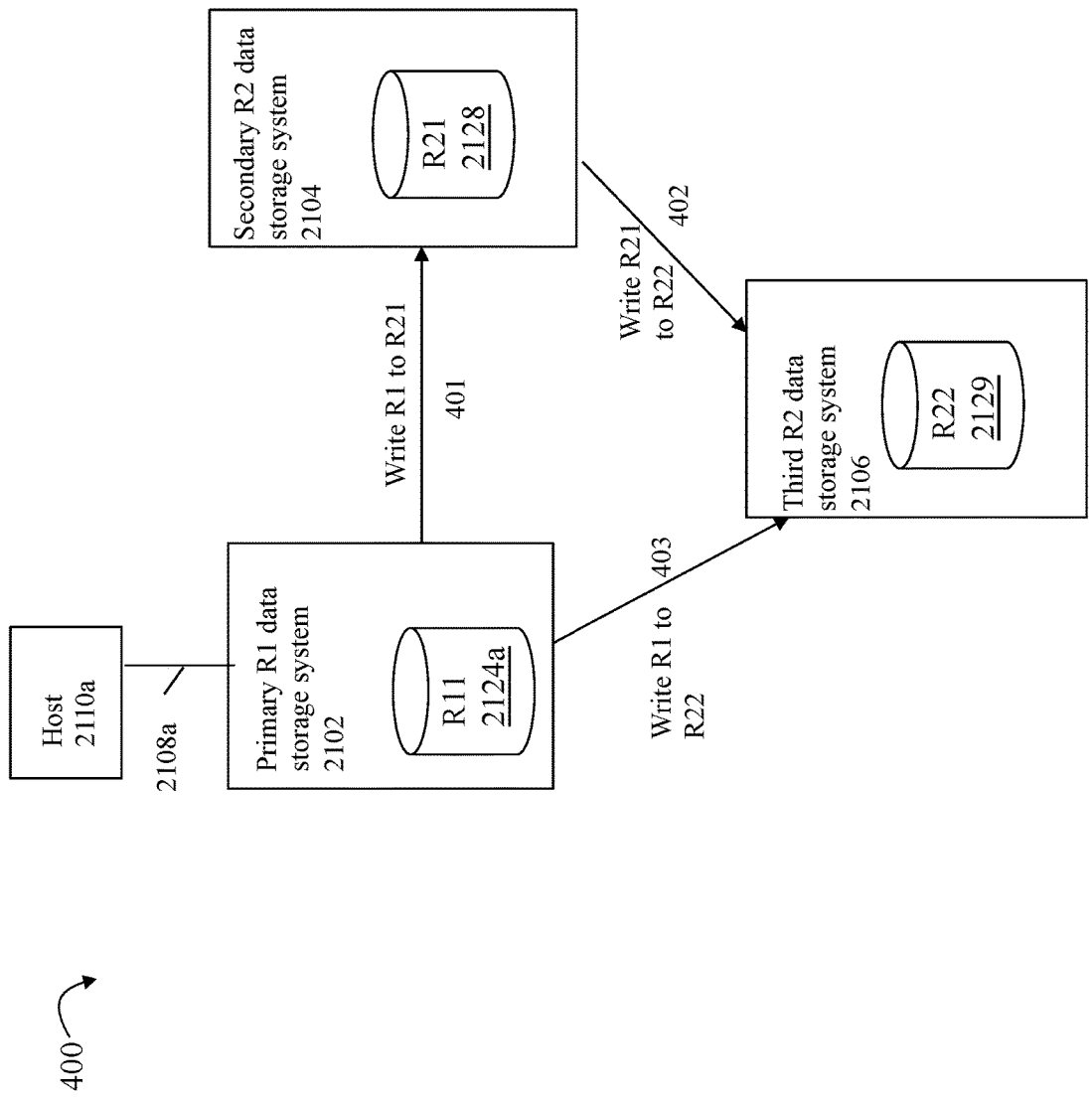

Referring to FIG. 8, shown is an example 400 of a triangular arrangement of data storage systems used in connection with remote replication in an embodiment in accordance with the techniques herein. The example 400 illustrates another three-site or data storage system disaster recovery solution involving 3 legs or hops between data storage systems. The device R11 2124a of the R1 system 2102 is mirrored concurrently to the two devices R22 2129 and R21 2128. Additionally the device R21 2128 is mirrored to the device R22 2129.

The example 200 includes the host 2110a; the data storage systems 2102, 2104, 2106; and the RDF connections or links 401 402 and 403. A first replication group may include the first RDF device pairing of R11 2124a and R21 2128 configured for synchronous replication where the link 401 is used to replicate writes of R11 2124a to R21 2128. A second replication group may include the second RDF device pairing of R21 2128 and R22 2129 configured for asynchronous replication where the link 402 is used to replicate writes of R21 2128 to R22 2129. A third replication group may include the third RDF device pairing of R11 2124a and R22 2129 configured for asynchronous replication where the link 403 is used to replicate writes of R11 2124a to R22 2129.

The arrangement of FIG. 8 illustrates 3 sites or data storage systems with 3 hops or legs using the links 401, 402 and 403. In connection with the example 400, the device R22 2129 is configured as a target R2 device of two RDF device pairings. With the triangular configuration in at least one embodiment, the device R22 2129 may actively receive writes from only one of the two configured RDF device pairings, where either writes over the link 403 for the RDF device pairing R11 2124a-R22 2129 is suspended, or writes over the link 402 for the RDF device pairing R21 2128-R22 2129 is suspended. For example, suppose the writes over the link 402 for the RDF device pairing R21 2128-R22 2129 are suspended. In this case, if the primary system 2102 and the device R11 2124a experience a disaster and are inaccessible to the host 2110a, the host 2110a may alternatively access the data on of R21 2128 on the system 2104. Writes over the link 402 may be active using the defined RDF device pairing R21 2128-R22 2129.

Generally, the foregoing FIGS. 3, 4, 5, 6, 7 and 8 illustrate different remote replication topologies. Additional topologies are possible such as based on various supported extensions and combinations of those described above. For example, an embodiment may support additional 3 site or data storage system topologies and configuration as well as various 4 site or data storage system topologies and configurations.

The configurations and topologies such as illustrated in the FIGS. 3 and 4 may be characterized in one aspect as single hop replication configurations with single replica legs between two data storage systems. The configurations and topologies such as illustrated in the FIGS. 5, 6, 7 and 8 are examples of multi-hop or multiple hop replication configurations including multiple replica legs. For example, FIG. 6 is a daisy chained or cascaded arrangement that includes a first replication hop or leg from the systems 2102 to 2104, and a second replication hop or leg from the systems 2104 to 2106. FIG. 7 is a concurrent arrangement that includes a first replication hop or leg from the systems 2102 to 2104, and a second replication hop or leg from the systems 2102 to 2106. FIG. 8 is a triangular arrangement of 3 systems or sites with 3 replication hops or legs—a first replication hop or leg from the systems 2102 to 2104, a second replication hop or leg from the systems 2104 to 2106 and a third replication hop or leg from the systems 2102 to 2106.

In at least one embodiment in accordance with the techniques herein, a replication group may be defined for each leg or hop in the remote replication configuration. For example, with reference to FIG. 6 which is a multi-hop remote replication configuration, a first replication group may be defined with respect to the RDF device pairings between the systems 2102 and 2104, and a second replication group may be defined with respect to the RDF device pairings between the systems 2104 and 2106. With reference to FIG. 7 which is a multi-hop remote replication configuration, a first replication group may be defined with respect to the RDF device pairings between the systems 2102 and 2104, and a second replication group may be defined with respect to the RDF device pairings between the systems 2102 and 2106.

In at least one embodiment, a replication group may generally include one or more SGs, where the replication group may be specified in connection with a remote replication leg or hop having any supported replication mode. In at least one embodiment, one typical application or usage may define a replication group in connection with a synchronous replication mode for a leg or hop where the replication group may include multiple SGs. In at least one embodiment, one typical application or usage may define a replication group in connection asynchronous replication mode for a leg or hop where the replication group may include only a source SG including the R1 devices of the primary, source or R1 data storage system, and a target SG including the R2 devices of the secondary, target or R2 data storage system.

What will now be described is further detail regarding embodiments of the techniques herein for evaluating the compliance of a remotely replicated data set, and reporting the current remote replication compliance of the data set.

In connection with the following paragraphs and also consistent with other discussion herein, a SG refers to the data set used by an application, and a remote replica or copy is a copy of the application's data set, or source SG, at another physical location. Additionally in at least one embodiment, a remote replication policy or service level for an application's data set includes the definition of the required remote replication configuration, a replication state and some other defined properties of the replication sessions. A replication leg or hop is a single association of two data storage systems having a device replica or R1-R2 relationship, where the R1 device is on one of the two data storage systems and the R2 device is on the other of the two data storage systems.

The following paragraphs describe an algorithm that may be used in at least one embodiment in accordance with the techniques herein. The algorithm provides for analyzing and evaluating the remote replication configuration for a data set, the current state of the remote replication, and the associated remote replication policy to determine a compliance level for the data set with respect to the associated remote replication policy.

In connection with evaluating the compliance of a remotely replicated data set, various criteria or conditions are evaluated when considering various different replication configurations for a data set. A data set may be expected to have a particular replication configuration, as defined in the data set's remote replication policy, for the full or complete data set (e.g., all LUNs of the data set). Generally, R1-R2 device pairs are associated with a replication group and have properties, such as replication mode, state, and others that may be used in connection with the techniques herein. Additionally, the device pairs or replication group may be expected to have certain properties in the configuration within specified thresholds as defined in the data set's associated remote replication policy. In at least one embodiment in accordance with the techniques herein, remote replication compliance may be periodically evaluated, such as at fixed or regular intervals, and a color coded value may be assigned to denote the compliance level determined as a result of the compliance checking processing performed. For example, in such an embodiment, the processing performed may determine one of the following compliance levels of normal, warning or error, corresponding respectively to the colors of green, yellow and red. In at least one embodiment, the compliance level determined may be green or normal if all the steps of the processing described herein are completed without a different compliance level or color being assigned by one of the processing steps.

As an example with reference to FIG. 3, consider a data set with the LUNs A1, B1 and C1, where the LUNs A1, B1 and C1 are included in the storage group SG1 on a primary data storage system. In connection with the storage group SG1 as the application data set in this example, remote replication of the data set may be provided with reference to a simple configuration or topology as in FIG. 3. The storage group SG1 may be defined on the primary system 2102. On the remote or secondary data storage system 2104, a second storage group SG2 may be defined that includes the LUNs A2, B2 and C2. The RDF device pairings may be the LUNs A1-A2, the LUNs B1-B2, and the LUNs C1-C2. The replication group G1 may be the RDF device pairings of the LUNs A1-A2, LUNs B1-B2, and LUNs C1-C2.

What will now be described is processing that may be performed in an embodiment in accordance with the techniques herein to evaluate the compliance of the remote replication of a data set with respect to its current remote replication configuration and associated remote replication policy. As an example, consider the above-noted replication group G1 being evaluated by such processing to determine a compliance level for the replication group G1 including SG1 and SG2, where G1 is formed from the RDF device pairings of the LUNs A1-A2, LUNs B1-B2, and LUNs C1-C2. In this example, the data set may be denoted by the LUNs of SG1 of the R1 data storage system.

Initially, the compliance level is assigned normal or green. During processing described below which evaluates the compliance of the remote replication for G1, the compliance level may be modified to warning/yellow, or error/red, depending on the results of each step performed. In at least one embodiment, the evaluation processing for compliance may stop if the compliance level is assigned an error/red level. However, the evaluation processing may continue if the compliance level is assigned a warning/yellow level or otherwise remains normal/green. The compliance level is not modified by a processing step if the processing is successful and meets the specified one or more criteria or conditions of the processing step. Otherwise, the compliance level is accordingly modified to the warning/yellow level, or the error/red level. Thus, at the completion of the evaluation processing, the compliance level may denote the lowest or worst compliance level determined may any individual step that is executed. In such an embodiment, the compliance levels, from highest or best to lowest or worst may be ranked, respectively, as normal/green, warning/yellow, and error/red. Once evaluation processing for a data set modifies or lowers the compliance level to the warning/yellow level, the compliance level cannot return to a better or higher level of normal or green. Once evaluation processing for a data set modifies or lowers the compliance level to the error/red level, the compliance level cannot return to a better or higher level (e.g., compliance level cannot return to normal/green or warning/yellow). As a result in at least one embodiment, when evaluation processing to determine a compliance level for a replication group completes, the compliance level will be normal or green if all processing steps executed successfully and no executed step has assigned the compliance level of warning/yellow or error/red.

Consistent with discussion herein, the compliance level for the application data set is based on the aggregate compliance level determined for all one or more hops or replication legs of the data set's remote replication configuration. Thus, the compliance level for the application data is warning or yellow if the compliance level is set to warning or yellow with respect to any hop or replication leg of the existing remote replication configuration of the application data; and the compliance level for the application data is error or red if the compliance level is set to error or red with respect to any hop or replication leg of the existing remote replication configuration of the application data.

Generally, criteria may be used to characterize the conditions checked in connection with processing described in the following paragraphs such as in connection with the steps S1, S2, S3, S4 and S5 (and any substeps thereof).

As a first step S1, processing may include analyzing the configuration and topology of the remote replication for the data set in accordance with the remote replication configuration requirements or definition as may be specified in the associated remote replication policy for the data set. Generally, the step S1 includes ensuring or verifying that the existing topology of the current remote replication configuration for the data set matches a specified remote replication topology of the policy associated with the data set. The step S1 may include examining the topology of the current remote replication to determine the number of replication hops or legs and then determining the replication group defined for each leg or hop. Generally, the replication groups including the RDF device pairings for each replication leg or hop between data storage systems may be identified in the step S1. If the existing remote replication topology does not match that specified in the policy, or if a replication group is not defined for each hop or leg of the existing remote replication topology, verification processing of the step S1 fails and processing then assigns the error or red to the compliance level, records the reason for assigning the error or red compliance level, and processing may stop. Otherwise, processing may proceed without modifying the compliance level.

In at least one embodiment, the topologies of two remote replication configurations may be considered as matching if they have both have the same number of hops or legs and where the hops or legs are configured in the same arrangement relative to one another and having the same connections in the arrangement. For example, the remote replication configurations of FIGS. 6 and 7 have the same number of hops or legs but are arranged differently. In FIG. 6, the 2 legs are arranged in serial or cascaded, and in contrast, FIG. 7, both hops or legs are connected to the primary R1 system 2102. Thus, for example, each topology of a remote replication configuration may be represented as a graph where the data storage systems are nodes and the connection between a pair of systems, and thus nodes representing the systems, correspond to the defined replication group and RDF links between the pair of system. In this case, two remote replication configurations may be represented by two graphs where the two graphs may be determined to have the same topology if they both have the same number of nodes and they both have the same set of edges or connections between the same pairs of nodes. Additionally, neither graph has any additional edges or nodes than the other graph. Additionally, in at least one embodiment, determining whether two remote replication topologies match may include examining pairs of corresponding replication legs or hops in the two topologies (one leg in each topology) and determining whether the corresponding replication legs or hops both have the same associated replication mode. In matching topologies, each pair of corresponding replication legs or hops in the two topologies (one leg in each topology) has the same associated replication mode. For example, a first topology of a policy may be a single hop as in FIG. 3 from a first system to a second system and the policy may indicate that the single hop is to be configured in asynchronous replication mode. A second topology of an existing remote replication configuration may be determined to match the first topology of the policy if the second topology denotes a single hop configuration where the single hop is also configured in asynchronous replication mode.

For example, consider the example described above with the replication group G1 with the 3 RDF device pairings (e.g., LUNs A1-A2; LUNs B1-B2; and LUNs C1-C2) and the storage groups SG1 and SG2 in a configuration as illustrated in FIG. 3, a single hop and single replication group is identified. The step S1 may include processing that determines whether the current remote replication topology, which is a single hop or leg, matches the specified required topology of the policy specified for the data set SG1. In this example, the current remote replication topology of the data set matches the required topology of the policy for the data set. However, if the current topology and the required topology of the policy do not match, processing then assigns the error or red to the compliance level, records the reason for assigning the error or red compliance level, and processing may stop. The step S1 may also include determining the replication group defined for each replication leg or hop. In connection with the example, the replication group G1 is determined for the single leg or hop of the topology. If no such replication group is defined for each replication leg or hop, processing then assigns the error or red to the compliance level, records the reason for assigning the error or red compliance level, and processing may stop.

As a variation, assume a configuration as illustrated in FIG. 6. In this case, the step S1 may determine a cascaded topology with multiple hops including a first replication group that defines the RDF device pairings between the primary system 2102 and the secondary system 2104, and a second replication group that defines the RDF device pairings between the system 2104 (as the primary system) and the system 2106 (as the secondary system). If the cascaded topology of the current remote replication configuration does not match the required topology specified in the policy, processing then assigns the error or red to the compliance level, records the reason for assigning the error or red compliance level, and processing may stop. Additionally, if a replication group is not defined for each hop or leg, processing then assigns error or red to the compliance level, records the reason for assigning the error or red compliance level, and processing may stop.

As a variation, assume a configuration as illustrated in FIG. 7. In this case, the step S1 may determine a concurrent topology with multiple hops including a first replication group that defines the RDF device pairings between the primary system 2102 and the secondary system 2104, and a second replication group that defines the RDF device pairings between the system 2102 (as the primary system) and the system 2106 (as the secondary system). If the concurrent topology of the current remote replication configuration does not match the required topology specified in the policy, processing then assigns error or red to the compliance level, records the reason for assigning the error or red compliance level, and processing may stop. Additionally, if a replication group is not defined for each hop or leg, processing then assigns error or read to the compliance level, records the reason for assigning the error or red compliance level, and processing may stop.

The step S1 may include performing the steps S1a-S1f for each replication group associated with a hop or leg of the existing remote replication configuration. Generally, the steps S1a-S1f may check different properties or attributes of each replication group associated with a hop or leg of the existing remote replication configuration.

The step S1a may include checking whether the replication group is offline. If so, processing then assigns error or red to the compliance level, records the reason for assigning the error or red compliance level, and processing may stop. Otherwise, if the replication group is not offline, the compliance level is not modified and processing may continue.

In at least one embodiment, determining whether a replication group is offline or otherwise online may include determining that the one or more RDF links (e.g., used for remote replication between the R1 and R2 devices of the RDF device pairings of the replication group) are healthy and functioning.

It should be noted that in at least one embodiment, a replication group may be determined as online when there is at least one network path, such as one link used for remote replication, from one data storage system to the remote data storage system for the replication group. Otherwise the replication group may be considered as offline. The replication group may generally have two or more paths or links used for remote replication for purposes of redundancy. If none of the paths is functioning and able to be used for transmitting data between the two systems, then there's no communication of data for remote replication between the two systems whereby the replication group may be considered offline, rather than online. In such an embodiment, multiple links may be specified for use in connection with remote replication for a single replication group (e.g., multiple links between a first set of multiple ports of the R1 system and a second set of multiple ports of the R2 system).

From the step S1a, processing may continue with performing the step S1b. In the step S1b, processing may include checking whether the replication group has an associated state or property of transmit idle. A replication group is characterized as being in the transmit idle state if the group is not offline but processing does not detect any data being transmitted over any of the one or more RDF links assigned for use by the replication group. Thus, no replication data is being transmitted over the one or more RDF links assigned to the replication group for remote replication. If the replication group is in the transmit idle state, processing then assigns error or red to the compliance level, records the reason for assigning the error or red compliance level, and processing may stop. The transmit idle property or state may be associated with, for example, a problem with one or more of the ports associated with the one or more RDF links assigned for use in replicating data for the replication group. If the replication group is not in the transmit idle state, processing continues for the replication group without modifying the compliance level. From the step S1b, control proceeds to the step S1c.

In the step S1c, processing determines whether the replication group is being used for the purposes of migrating data between the R1 and R2 data storage systems, rather than for remote replication. In at least one embodiment, a replication group may be configured and used for one or more other purposes besides remote replication. If a property or other information about the replication group indicates it is being used for migration, or more generally, a different use other than remote replication, the processing of the techniques herein performed to determine a compliance level for this replication group regarding remote replication may stop thereby skipping this replication group. Otherwise, processing continues for the replication group. From the step S1c, control proceeds to step S1d. In at least one embodiment, an indication regarding use of the replication group for migration or other purposes may be specified in the remote replication policy associated with the replication group.

In the step S1d, processing is performed to determine whether the replication group is configured for asynchronous remote replication. If so, the step S1d may further include determining whether spillover is detected. If the replication group is configured for asynchronous replication and spillover is detected, processing then assigns the warning or yellow to the compliance level, records the reason for assigning the warning or yellow compliance level, and processing may continue. Otherwise, if the replication group is not configured for asynchronous replication, or the replication group is configured for asynchronous replication but spillover is not detected, then processing continues without modifying the compliance level.

As described elsewhere herein in connection with asynchronous replication, a host writes data to an R1 device on the R1 system and an acknowledgement is returned to the host without waiting for the data transmission to the R2 system (including the R2 device) to complete. The data written to the R1 device by the host may be transmitted in batches or buckets of multiple writes from the R1 system to the R2 system. The write data waiting to be transmitted from the R1 system to the R2 system may be stored in a buffer or memory. In the event the host issues write I/Os that write data at a faster rate than the current rate at which write data is transmitted from the R1 to the R2 system, the buffer or memory may be filled with write data waiting to be transmitted. In some cases, the buffer may overflow and the additional write data waiting to be transmitted from the R1 to the R2 system may stored in an overflow buffer or area. If processing determines that the write data awaiting transmission over an RDF link in connection with remote replication is stored in the overflow buffer, it means that the host is writing at this faster pace. A warning or yellow compliance level may be set to denote that if the host writing burst continues at the current faster pace, the overflow buffer may also soon be filled causing problems for the remote replication (e.g., the delta or difference between the R1 and R2 devices may increase to an undesirable level, an excessive and undesirable amount of R1 system memory and other resources may be used buffer and manage the write data awaiting transmission, and the like).

From the step S1d, control proceeds to the step S1e. In the step S1e, processing may determine whether the replication group is supported by two or more ports on each of the R1 and R2 data storage systems. For example, consider the replication group G1 described above. The step S1e determines whether at least 2 ports of the R1 system are configured for use with the replication group G1 and whether at least 2 ports of the R2 system are configured for use with the replication group G1. If no, processing then assigns the warning or yellow level to the compliance level, records the reason for assigning the warning or yellow compliance level, and processing may continue. Generally, if only a single port is configured for remote replication use for the replication group on either the R1 or R2 systems, then remote replication would not be able to continue if the single port failed. As such, processing may flag such a condition or state with the warning or yellow compliance level. If the step S1e does determine that at least 2 ports of the R1 system and at least 2 ports of the R2 system are configured for replication use with the replication group G1, processing continues without modifying the compliance level.

From the step S1e, control proceeds to the step S1f. At the step S1f, a determination is made as to whether the replication group is configured for asynchronous remote replication and if so, has the observed maximum (max) cycle time in the last monitoring interval exceeded a maximum threshold specified in the replication group's policy. If the replication group is configured for asynchronous replication and its observed max cycle time exceeds the maximum threshold, processing then assigns warning or yellow to the compliance level, records the reason for assigning the warning or yellow compliance level, and processing may continue.

In connection with the step S1f, a cycle may be a time interval, such as 15 seconds, where data written to an R1 device in each 15 second interval may be collected in a single cycle and then transmitted from the R1 system to the R2 system. Thus, the cycle time for an R1-R2 RDF device pairing may denote how far behind or out of synchronization the remote R2 device contents is with respect to its partner R1 device. The maximum threshold (for cycle time) of a policy may be based on an RPO (recovery point objective)

denoting a measure of how much data an application can afford to lose before it impacts business operations. For example, for an application such as a banking application or a stock market application, more than 3 cycles or 45 seconds of data loss may be unacceptable or intolerable. Thus, for such an application having a data set being remotely replication, a policy may specify a maximum threshold of 3 cycles or 45 seconds denoting the maximum tolerance or difference between the R1 and R2 devices of a single RDF pairing. Processing in accordance with the techniques herein may record the highest or maximum (max) cycle time for the data set observed in each monitoring interval or time period. If the observed max cycle time exceeds the specified maximum threshold of the policy associated with the replication group, processing then assigns warning or yellow to the compliance level, records the reason for assigning the warning or yellow compliance level, and processing may continue. Otherwise if the observed max cycle time does not exceed the specified maximum threshold of the policy associated with the replication group, processing continues without further modifying the compliance level.

Consistent with discussion above, the step S1 and its associated property checks of the step S1a-S1f are performed for each replication leg or hop of the existing remote replication configuration for the application data set such as SG1. Collectively, the compliance level for the application data set is based on the aggregate compliance level determined for all one or more hops or replication legs of the data set's remote replication configuration.

From the step S1f, control proceeds to the step S2. In the step S2, processing is performed to check that all LUNs of the application data set are remotely replicated and thus considered fully protected with respect to each log or hop of the remote replication configuration. Consider the example described above in connection with FIG. 3 for the replication group G1 for the data set with the LUNs A1, B1 and C1, where the LUNs A1, B1 and C1 are included in the storage group SG1 on a primary data storage system. In connection with the storage group SG1 as the application data set in this example, full protection with respect to remote replication of the data set may be provided with reference to a simple configuration or topology as in FIG. 3. The storage group SG1 may be defined on the system 2102. On the remote or secondary data storage system 2104, a second storage group SG2 may be defined that includes the LUNs A2, B2 and C2. The RDF device pairings may be the LUNs A1-A2, the LUNs B1-B2, and the LUNs C1-C2. The replication group G1 may be the RDF device pairings of the LUNs A1-A2, LUNs B1-B2, and LUNs C1-C2. Thus, the replication group G1 may be characterized as fully protected by remote replication, where the data set SG1 is fully protected by remote replication with SG2. The step S2 checks to ensure, for example, that all 3 LUNs A1, A2 and A3 of SG1, not a smaller subset such as just 2 LUN of SG1, are configured for remote replication. If the step S2 determines that all devices or LUNs of the data set, such as SG1 are not configured for remote replication, processing then assigns error or red to the compliance level, records the reason for assigning the error or red compliance level, and processing may stop. Otherwise if the step S2 determines that all devices or LUNs of the data set are configured for remote replication, processing continues without further modifying the compliance level.

The step S2 is performed with respect to each replication leg or hop of the remote replication configuration.

From the step S2, control proceeds to the step S3. In the step S3, processing may be performed to determine whether all LUNs of the existing data set, such as SG1, and their associated remote replicas (as defined by the RDF device pairings) are in the same replication group and all RDF device pairings of the replication group are configured for the same replication mode. For example, consider the data set SG1 that includes the LUNs A1, B1 and C1. The step S3 may determine that the LUNs A1, B1 and C1 and their respective remote R2 replicas, LUNs A2, B2 and C2, are in the same replication group G1. Additionally, the step S3 may determine that the 3 RDF device pairings: A1-A2, B1-B2 and C1-C2 are all configured for the same remote replication mode, such as all asynchronous. If the step S3 verification fails where all LUNs of SG1 and their respective R2 remote replicas are not in the same replication group and all RDF device pairings of the replication group are not the same remote replication mode, processing then assigns error or red to the compliance level, records the reason for assigning the error or red compliance level, and processing may stop. Otherwise, if the step S3 verification succeeds, processing may continue without modifying the compliance level.

The step S3 is performed with respect to each replication leg or hop of the remote replication configuration.

From the step S3, control proceeds to the step S4. In the step S4, processing is performed to verify that all LUNs of the data set have the same replication configuration in terms of the number of remote replicas at each node or data storage system in the configuration. In other words, for each hop or leg of the configuration, the step S4 verifies that the replication group for the hop includes the same number of LUNs in each source or R1 system and each remote or R2 system. Each LUN of the data set in the R1 system has a corresponding remote replica on each data storage system of each leg or hop. Thus, each LUN of the data set on the R1 system is replicated at each data storage system in all legs or hops in the remote replication configuration. For example consider a single hop configuration as in FIG. 3 for the data set SG1 that includes the LUNs A1, B1 and C1 in the R1 system 2102, and includes the LUNs A2, B2, and C2 in the storage group SG2 in the R2 system 2104, and the 3 RDF device pairings: A1-A2, B1-B2 and C1-C2. In this case, the step S4 determines that the R1 system includes 3 LUNs and the R2 system includes 3 LUNs whereby the step S4 verification is successful.

As another example in connection with the step S4, consider a multihop configuration in a cascaded arrangement as in FIG. 6. Assume that the storage group SG X1 is defined on the primary R1 system 2102 and included 10 LUNs, the storage group X2 is defined on the secondary R2 system 2104 and includes 10 LUNs and the storage group X3 as defined on the third R2 system 2106 and includes 5 LUNs. A first replication group is configured to include 10 RDF device pairings between the 10 LUNs of the storage group X1 and the 10 LUNs of storage group X2, and a second replication group is configured to include 5 RDF device pairings between 5 LUNs of the storage group X2 and 5 LUNs of the storage group X3. In connection with this example, the verification of the step S4 fails in that although the systems 2102 and 2104 each include 10 LUNs, the system 2104 includes 10 LUNs and the system 2106 only includes 5 replica LUNs and the system 2106 should include 10 replica LUNs (e.g., the same number as the storage group X2 of the system 2104).

As another example in connection with the step S4, consider a multihop configuration in an arrangement as in FIG. 7. Assume that the storage group SG X1 is defined on the primary R1 system 2102 and includes 10 LUNs (LUNs A1-A10), the storage group X2 is defined on the secondary R2 system 2104 and includes 5 LUNs (LUNs B1-B5) and the storage group X3 as defined on the third R2 system 2106 and includes 5 LUNs (LUNs C1-C5). A first replication group is configured to include the 5 RDF device pairings A1-B1, A2-B2, A3-B3, A4-B4 and A5-B5, and a second replication group is configured to include the 5 RDF device pairings A6-C1, A7-C2, A8-C3, A9-C4 and A10-C5). In connection with this example, the verification of the step S4 fails in that the primary R1 system includes 10 LUNs having only 5 remote replicas on 2 different remote systems 2104, 2106. In order for the verification of the step S4 to succeed, each of the foregoing first and second replication groups needs to includes 10 RDF device pairings, where the is one RDF device pairing in each of the first and second replication groups for each of the 10 LUNs on the R1 system 2102.

If the verification of the step S4 fails, processing then assigns error or red to the compliance level, records the reason for assigning the error or red compliance level, and processing may stop. Otherwise, if the verification of the step S4 succeeds, processing may continue without modifying the compliance level.

From the step S4, control proceeds to the step S5. The step S5 may be performed for each device or LUN of each hop or replication leg. The step S5 may include performing the steps S5a-S5e described below. The step S5a may be performed to checks the replication pair state with respect to each RDF device pairing. The replication pair state with respect to each RDF device pairing may be characterized in one aspect as denoting the current state of the data transfer with respect to the R1 and R2 devices of the RDF device pairing. The replication pair states may vary with the supported remote replication modes and configurations as well as other aspects of an embodiment.

In the step S5a, if the RDF device pairing state for an R1-R2 device pair indicates that the data of the R2 device is fully synchronized with its paired R1 device, processing may continue with the step S5b without modifying the compliance level. In at least one embodiment, states indicating the data of the R2 device is fully synchronized with its paired R1 device may include synchronized, consistent, active-active and active-bias. In one embodiment "synchronized" may denote that the data of the R1 and R2 device of the pair are synchronized and the configured replication mode is synchronous; and "consistent" may denote that the data of the R1 and R2 device of the pair are synchronized and the configured replication mode is asynchronous. In an embodiment supporting the active replication mode (e.g., as described in connection with FIG. 5), both the active-bias and active witness replication pair states for an RDF device pairing indicate that the configured replication mode is active and the initial data synchronization between the R1 and R2 of the pairing has completed. The active-bias replication pair state further indicates processing performed if the RDF device pairing is not ready due to failure of the RDF link(s) used for remote replication of the R1 and R2 devices in the active configuration of FIG. 5. In this case, remote replication is unable to be performed to keep the R1 and R2 devices of the active-active configuration synchronized. Responsive to the failure of the RDF link(s) used for the RDF device pairing, only one of the R1 and R2 devices remains accessible to the host and other external clients. In at least one embodiment, the bias attribute may be associated with only one of the R1 and R2 devices of the pairing, where the device of the pairing with the bias attribute remains accessible to the host and the other device of the pairing becomes inaccessible to the host.

In the step S5a, if the RDF device pairing state for an R1-R2 device pair indicates that the data of the R2 device is not yet fully synchronized with its paired R1 device (e.g., the synchronization in progress state as described in more detail elsewhere herein) or is in acceptable state denoting an acceptable condition or reason that replication data is currently not being transmitted between the R1 system/device and the R2 system/device (e.g., the split or suspended states as described in more detail elsewhere herein), processing may assign warning or yellow to the compliance level, record the reason for assigning the warning or yellow compliance level, and continue processing with the step S5b. In at least one embodiment, the synchronization in progress state may denote that the data synchronization of the R1 and R2 devices is in progress whereby there are existing invalid tracks between the R1 and R2 devices, and the associated RDF links used for data transfer in the synchronization are up. The suspended and split states may both denote valid states of paused or no data transfer between the R1 and R2 devices. Suspended may indicate that the RDF link(s) used for the R1-R2 pair have been suspended and are not ready or are write disabled. With the suspended state where the R1 is ready while the links are suspended, any I/O accumulates as invalid tracks owed to the R2. With a state of split, the R1 and the R2 devices of the pair are currently ready to their hosts but the link(s) used for data transfers between the paired R1 and R2 devices are not ready or are write disabled.

In the step S5a, if the RDF device pairing state for an R1-R2 device pair indicates that replication data is currently not being transmitted between the R1 system/device and the R2 system/device due to an undesirable configuration, invalid condition, error state, or other unhealthy state or condition, processing then assigns error or red to the compliance level, records the reason for assigning the error or red compliance level, and processing may stop. Generally, replication pair states considered invalid or unsuitable (resulting in setting the compliance level to error or red) may denote unhealthy or invalid current conditions related to the R1 and R2 devices, the RDF link used between the pair for remote replication, the data storage systems, and the like. In at least one embodiment, RDF device pairing states that indicate replication data is currently not being transmitted between the R1 system/device and the R2 system/device due to an undesirable configuration, invalid condition or error state may include the partitioned state, the transmit idle state, the invalid state, or state is not available (e.g., cannot obtain the current RDF device pairing state for a particular R1-R2 device pair). The transmit idle state is described elsewhere herein. The replication pair state of "partition" denotes that the local R1 device and system are unable to communicate, respectively, with the remote R2 device and system.

After performing the step S5a, control proceeds to the step S5b where the device state of the R1 device of each RDF device pairing in the remote replication configuration is verified as being ready with respect to the host, whereby the host is able to issue I/Os to the R1 device. If the step S5b verification is successful and the R1 device state is ready with respect to the host, processing continues without modification to the compliance level. Otherwise, if the R1 device is another device state, such as not ready or write disabled with respect to the host, the compliance level is assigned warning or yellow, the reason for assigning the warning or yellow compliance level is recorded, and processing continues.

After performing the step S5b, control proceeds to the step S5c where the device state of the R2 device of each RDF device pairing in the remote replication configuration is examined. If the remote replication configuration includes the R1-R2 device pairing configured in an active-active configuration (e.g., as in FIG. 5) and the R2 device of the pairing is verified as being ready with respect to the host (where the host can issue I/Os to the R2 device), then processing continues without modifying the compliance level. Otherwise, if the R2 device of the pair is configured on a passive path where the R2 device is not accessible to the host for I/Os (such as in the case where the path is configured as passive and the host is unable to use the path for issuing I/Os to the R2 device) and the R2 device state is not ready or write disabled with respect to the host, then processing continues without modifying the compliance level. Otherwise if the R2 device state is ready with respect to the host and is exposed to the host on a passive path where the R2 device is inaccessible to the host for I/Os over the passive path, then processing assigns the compliance level of warning or yellow, records the reason for assigning the compliance level of warning or yellow, and continues with subsequent steps.

From the step S5c, control proceeds to the step S5d. The step S5d may be performed for each RDF device pairing in the remote replication configuration. In the step S5d, processing is performed to compare the current replication mode of the replication leg or hop associated with the RDF device pairing to the desired replication mode specified in the remote replication policy. If the current replication mode and the desired replication mode of the policy match, processing continues without modifying the compliance level. Otherwise, the compliance level is assigned the warning or yellow level, the reason for assigning the warning or yellow compliance level is recorded, and processing continues. For example, with reference to FIG. 3, assume an RDF device pairing A1-A2 is defined where A1 is LUN in the system 2102 and A2 is a LUN in the system 2104. The data set may include the storage group SG1 as described herein including the LUNs A1, B1 and C1 of the system 2102. In this example, the policy for the data set may indicate that the replication mode for the replication leg or hop between the systems 2102 and 2104 is expected to be asynchronous. However, the RDF device pairing A1-A2 may be configured as synchronous or adaptive copy which does not match the policy's replication mode of asynchronous. In this case, the compliance level for the data set is assigned warning or yellow, the reason for assigning the warning or yellow compliance level is recorded, and processing continues.

From the step S5d, control proceeds to the step S5e. In the step S5e, processing may be performed to determine for each R1-R2 RDF device pairing to determine whether the R2 device has any invalid tracks. Generally, a track of the R2 device of an RDF device pairing may be considered invalid if that track has not yet been copied from the R1 device. Thus the number of invalid tracks on the R2 device for the RDF device pairing may denote the number of tracks not yet initially copied from the paired R1 device. If the number of invalid tracks of the R2 device is greater than zero (0), processing may assign warning or yellow to the compliance level, record the reason for assigning warning or yellow to the compliance level, and continue processing. Otherwise, if the number of invalid tracks of the R2 device is zero, processing may continue without modifying the compliance level.

In connection with the foregoing processing performed to determine a compliance level with respect to remote replication for an application data set, such as a storage group on an R1 or primary data storage system, the compliance level may be returned to a user, recorded in a database or other data store, and the like. If the compliance level is normal/green, all of the above-noted processing steps completed successfully and the compliance level was not set to warning/yellow or error/red in any of the processing steps. If the compliance level is not normal/green, one or more reasons are recorded for each processing step which modified the compliance level from normal/green to either warning/yellow or error/red. Consistent with discussion above, the resulting compliance level for an application data set is warning/yellow if any processing step set the compliance level to warning/yellow and no processing step has otherwise set the compliance level to be error/red. The resulting compliance level for an application data set is error/red if any one of the processing steps has set the compliance level to error/red, which also causes the processing to terminate. In at least one embodiment as described herein, once an error/red compliance level is determined at one processing step, subsequent processing steps in the evaluation are not performed and the resulting compliance level for the data set is error/red.

What will now be described in connection with the FIGS. 9, 10, 11 and 12 are flowcharts of processing steps that may be performed in an embodiment in accordance with the techniques herein. The flowcharts of the FIGS. 9, 10, 11 and 12 summarize processing described above.

Figure 9:
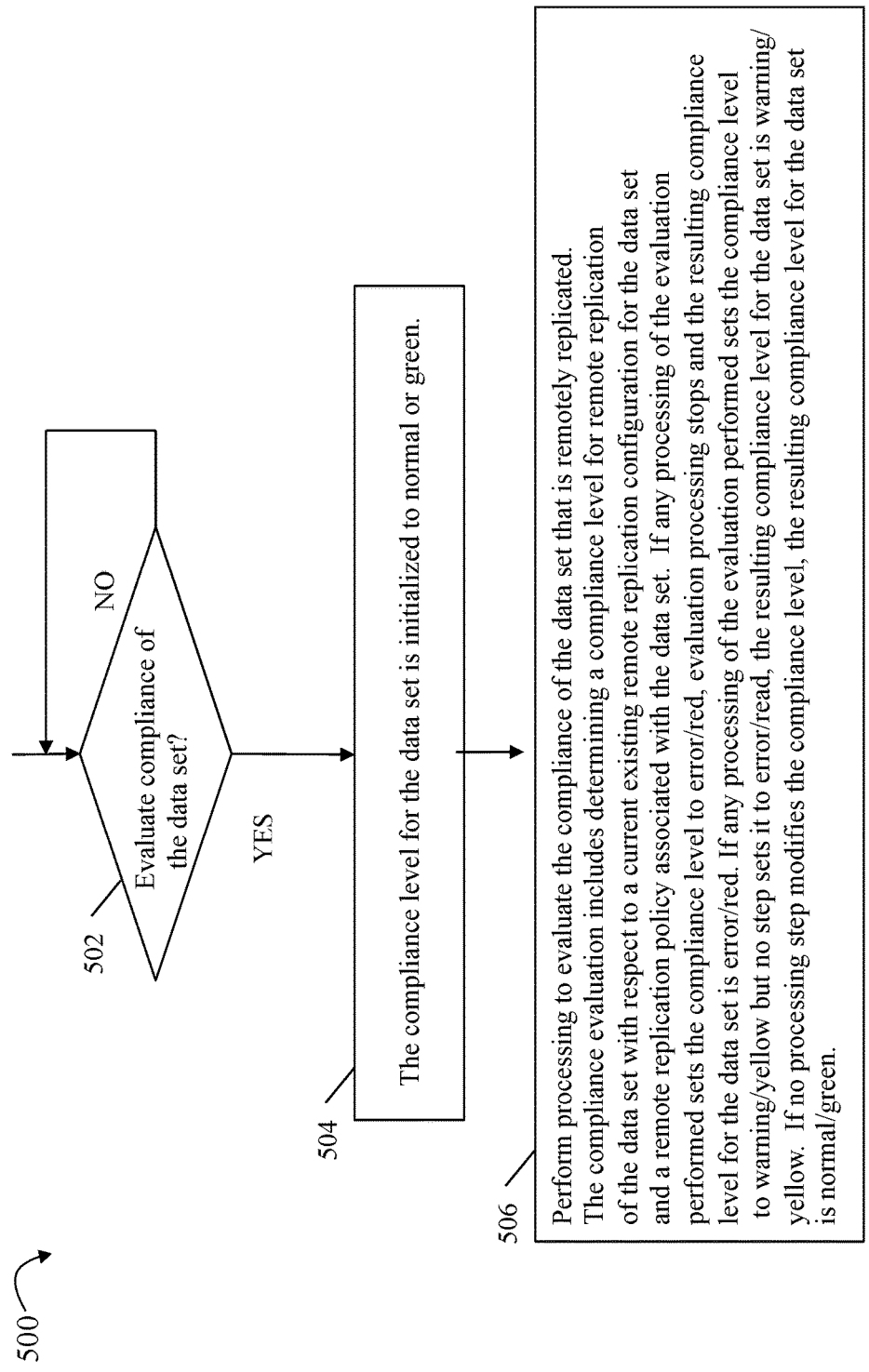
FIGS. 9, 10, 11, 12 and 13 are flowcharts of processing steps that may be performed in an embodiment in accordance with the techniques herein.

Referring to FIG. 9, shown is a first flowchart 500 of processing steps that may be performed in an embodiment in accordance with the techniques herein. At the step 502, a determination is made as to whether to perform processing to evaluate a data set. As described herein, a data set may be periodically evaluated to determine the compliance level with respect to the remote replication configuration for the data set. If the step 502 evaluates to no, control remains at the step 502. Otherwise if the step 502 evaluates to yes, control proceeds to the step 504.

At the step 504, the compliance level for the data set is initialized to normal or green. From the step 504, control proceeds to the step 506. At the step 506, processing is performed to evaluate the compliance of the data set that is remotely replicated. The compliance evaluation includes determining a compliance level for remote replication of the data set with respect to a current existing remote replication configuration for the data set and a remote replication policy associated with the data set. If any processing of the evaluation performed sets the compliance level to error/red, evaluation processing stops and the resulting compliance level for the data set is error/red. If any processing of the evaluation performed sets the compliance level to warning/yellow but no step sets it to error/read, the resulting compliance level for the data set is warning/yellow. If no processing step modifies the compliance level, the resulting compliance level for the data set is normal/green.

It should be noted that any suitable action may be taken responsive to determining the compliance level for the remote replication configuration of a data set. In particular, responsive to determining the compliance level denotes an error or red, processing may be performed to notify a user regarding the compliance level. The notification may be performed in any suitable manner such as via email, as an alert on a GUI, and the like. On the GUI, the alert may be color coded such as with the associated color level indicator associated with the resulting value of the compliance level. Responsive to determining the compliance level is red, a corrective action may be performed to remove or attempt to alleviate the condition(s) that caused the red. For example, if the condition was due to an inconsistency between the policy and a current value of the remote replication configuration for the data set, the remote replication configuration may be modified to be consistent with the policy. Such corrections may be done manually or automatically in response to determining the compliance level is red for particular criteria or conditions as recorded during the evaluation processing performed to determine the compliance level for the data set.

Figure 10:
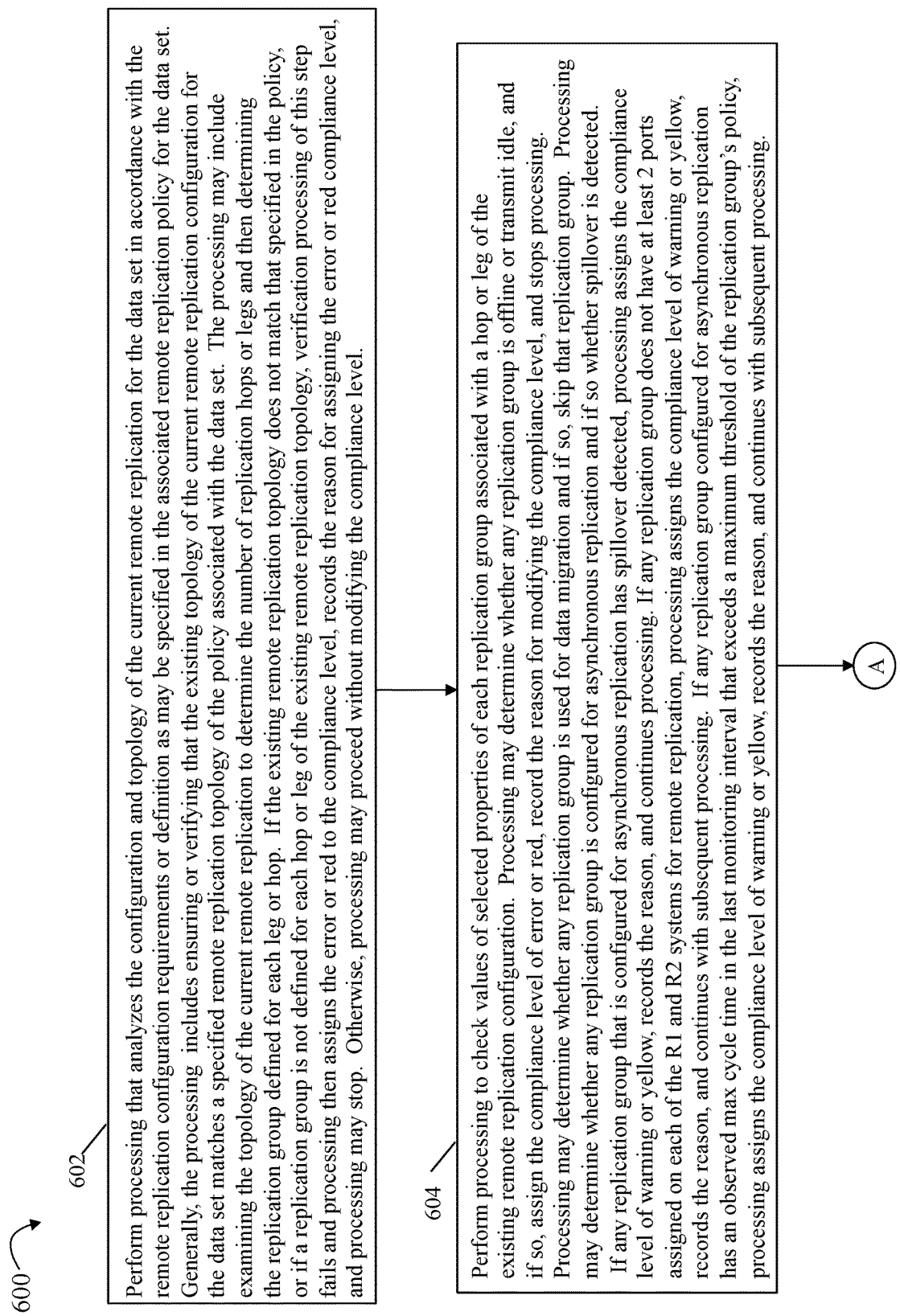
Figure 11:
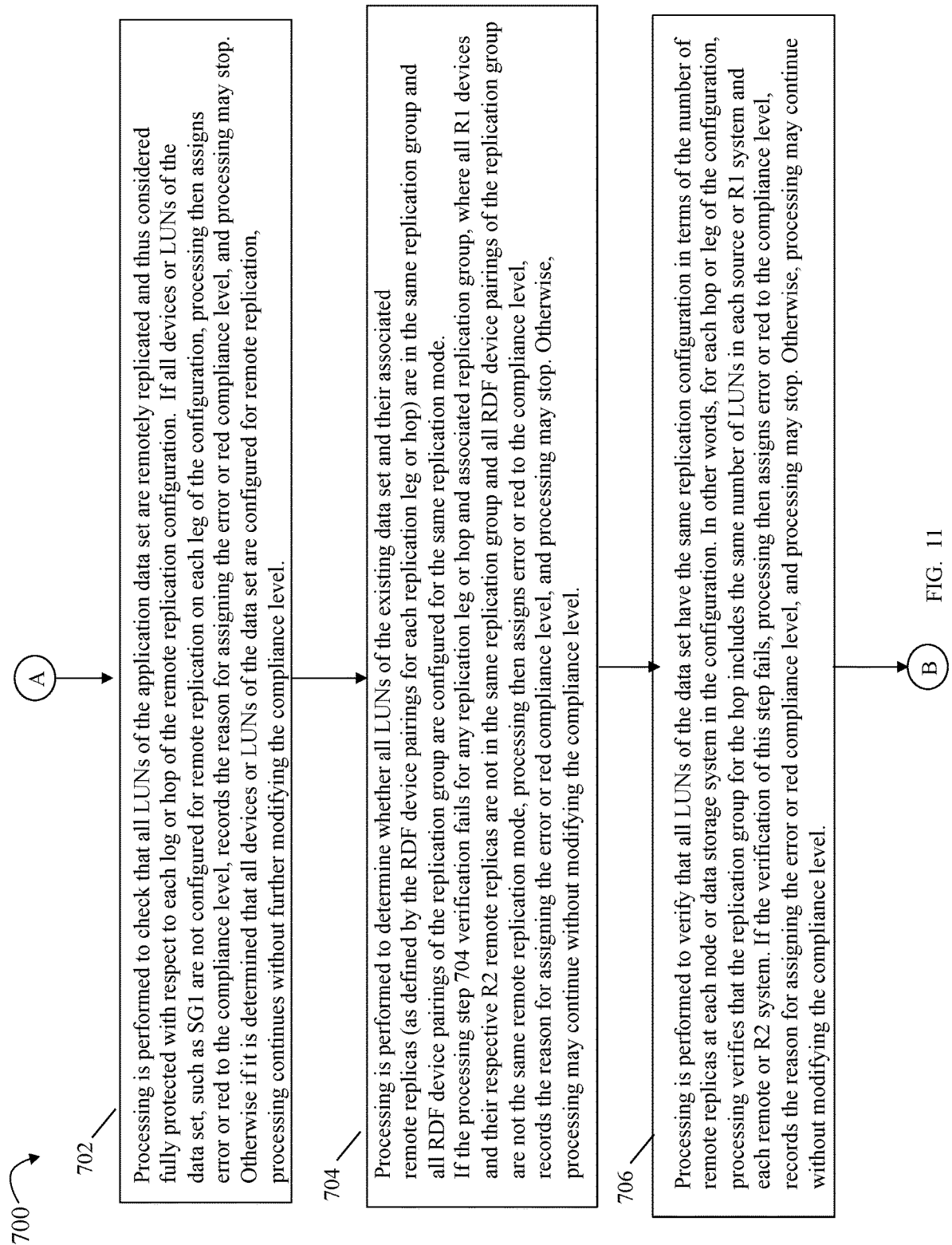
Figure 12:
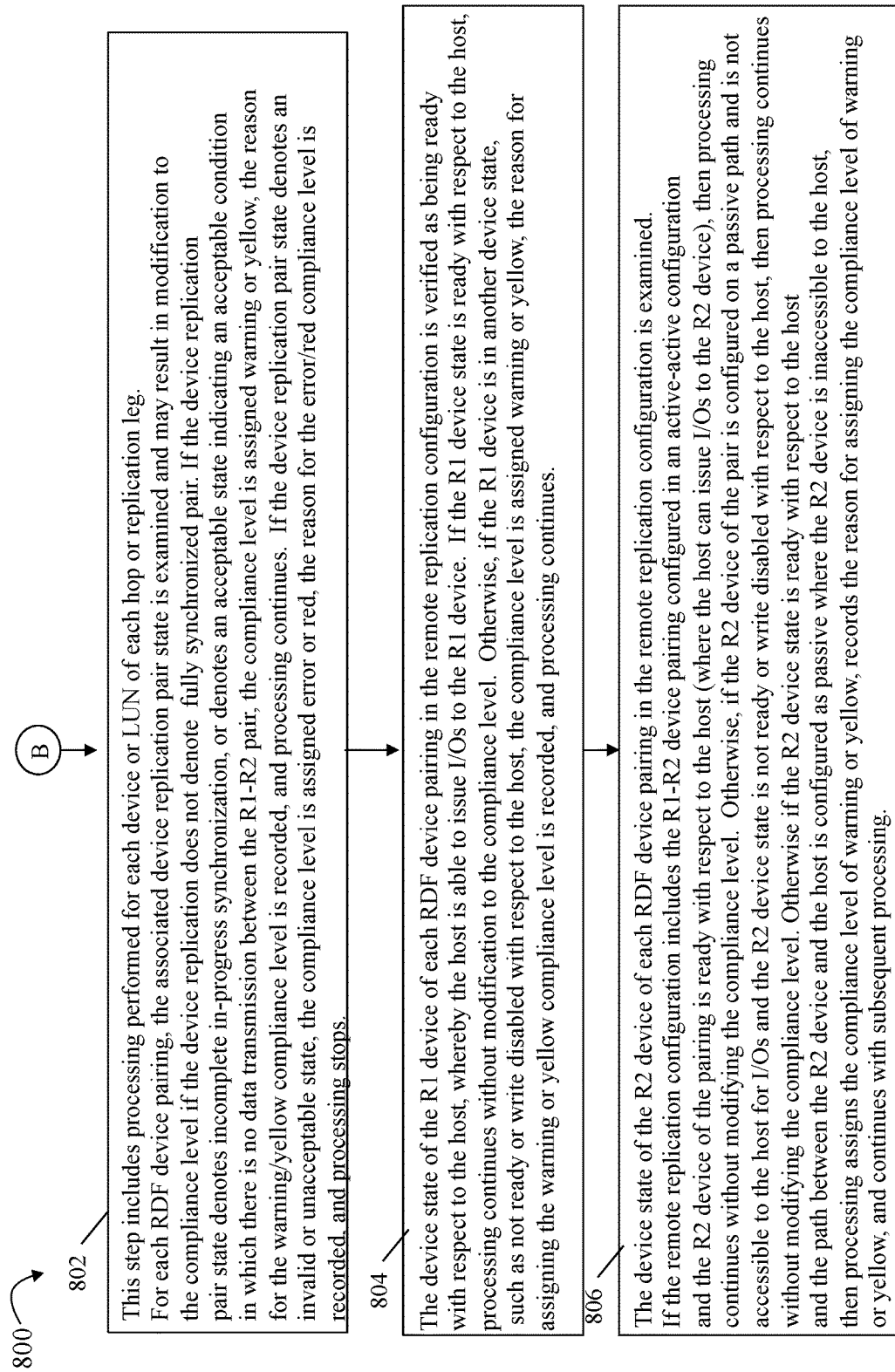

What will now be described in connection with the flowcharts 600, 700 and 800, respectively, of the FIGS. 10, 11 and 12 are further details regarding the evaluation processing performed in the step 506 to determine the compliance level of the remote replication of the data set.

Referring to FIG. 10, shown is a second flowchart 600 of processing steps that may be performed in an embodiment in accordance with the techniques herein. At the step 602, processing is performed that analyzes the configuration and topology of the current remote replication for the data set in accordance with the remote replication configuration requirements or definition as specified in the associated remote replication policy for the data set.

The processing of the step 602 includes ensuring or verifying that the existing topology of the current remote replication configuration for the data set matches a specified remote replication topology of the policy associated with the data set. The processing may include examining the topology of the current remote replication to determine the number of replication hops or legs and then determining the replication group defined for each leg or hop. If the existing remote replication topology does not match that specified in the policy, or if a replication group is not defined for each hop or leg of the existing remote replication topology, verification processing of this step fails and processing then assigns the error or red to the compliance level, records the reason for assigning the error or red compliance level, and processing may stop. Otherwise, processing may proceed without modifying the compliance level. If the step 602 does not include assigning the compliance level to error or red and stopping processing, control proceeds from the step 602 to the step 604.

At the step 604, processing is performed to check values of selected properties of each replication group associated with a hop or leg of the existing remote replication configuration. Processing of the step 604 may determine whether any replication group is offline or transmit idle, and if so, assign the compliance level of error or red, record the reason, and stops processing. Processing of the step 604 may determine whether any replication group is used for data migration and if so, skip that replication group. Processing of the step 604 may determine whether any replication group is configured for asynchronous replication and if so whether spillover is detected. If any replication group that is configured for asynchronous replication has spillover detected, processing assigns the compliance level of warning or yellow, records the reason for modifying the compliance level, and continues processing. If any replication group does not have at least 2 ports assigned on each of the R1 and R2 systems for remote replication, processing assigns the compliance level of warning or yellow, records the reason for modifying the compliance level, and continues processing. If any replication group configured for asynchronous replication has an observed max cycle time in the last monitoring interval that exceeds a maximum threshold of the replication group's policy, processing assigns the compliance level of warning or yellow, records the reason for modifying the compliance level, and continues processing.

If the step 604 does not include assigning the compliance level to error or red and stopping processing, control proceeds from the step 604 to the step 702 of the flowchart 700 of FIG. 11.

At the step 702, processing is performed to check that all LUNs of the application data set are remotely replicated and thus considered fully protected with respect to each log or hop of the remote replication configuration. If all devices or LUNs of the data set, such as SG1 are not configured for remote replication on each leg of the configuration, processing then assigns error or red to the compliance level, records the reason for assigning the error or red compliance level, and processing may stop. Otherwise if it is determined that all devices or LUNs of the data set are configured for remote replication, processing continues without further modifying the compliance level. If the step 702 does not include assigning the compliance level to error or red and stopping processing, control proceeds from the step 702 to the step 704.

At the step 704, processing is performed to determine whether all LUNs of the existing data set and their associated remote replicas (as defined by the RDF device pairings for each replication leg or hop) are in the same replication group and all RDF device pairings of the replication group are configured for the same replication mode. If the processing step 704 verification fails for any replication leg or hop and associated replication group, where all R1 devices and their respective R2 remote replicas are not in the same replication group and all RDF device pairings of the replication group are not the same remote replication mode, processing then assigns error or red to the compliance level, records the reason for assigning the error or red compliance level, and processing may stop. Otherwise, processing may continue without modifying the compliance level. If the step 704 does not include assigning the compliance level to error or red and stopping processing, control proceeds from the step 704 to the step 706.

At the step 706, processing is performed to verify that all LUNs of the data set have the same replication configuration in terms of the number of remote replicas at each node or data storage system in the configuration. In other words, for each hop or leg of the configuration, processing verifies that the replication group for the hop includes the same number of LUNs in each source or R1 system and each remote or R2 system. If the verification of this step fails, processing then assigns error or red to the compliance level, records the reason for assigning the error or red compliance level, and processing may stop. Otherwise, processing may continue without modifying the compliance level. If the step 706 does not include assigning the compliance level to error or red and stopping processing, control proceeds from the step 706 to the step 802 of the flowchart 800 of FIG. 12.

At the step 802, process is performed for each device or LUN of each hop or replication leg. In the step 802, for each RDF device pairing, the associated device replication pair state is examined and may result in modification to the compliance level if the device replication does not denote a fully synchronized pair. If the device replication pair state denotes incomplete or in-progress synchronization, or denotes an acceptable state indicating an acceptable condition in which there is no data transmission between the R1-R2 pair, the compliance level is assigned warning or yellow, the reason for the warning/yellow compliance level is recorded, and processing continues. If the device replication pair state denotes an invalid or unacceptable state, the compliance level is assigned error or red, the reason for the error/red compliance level is recorded, and processing stops.

If the step 802 does not include assigning the compliance level to error or red and stopping processing, control proceeds from the step 802 to the step 804.

At the step 804, the device state of the R1 device of each RDF device pairing in the remote replication configuration is verified as being ready with respect to the host, whereby the host is able to issue I/Os to the R1 device. If the R1 device state is ready with respect to the host, processing continues without modification to the compliance level. Otherwise, if the R1 device is in another device state, such as not ready or write disabled with respect to the host, the compliance level is assigned warning or yellow, the reason for assigning the warning or yellow compliance level is recorded, and processing continues. From the step 804, control proceeds to the step 806.

Figure 13:
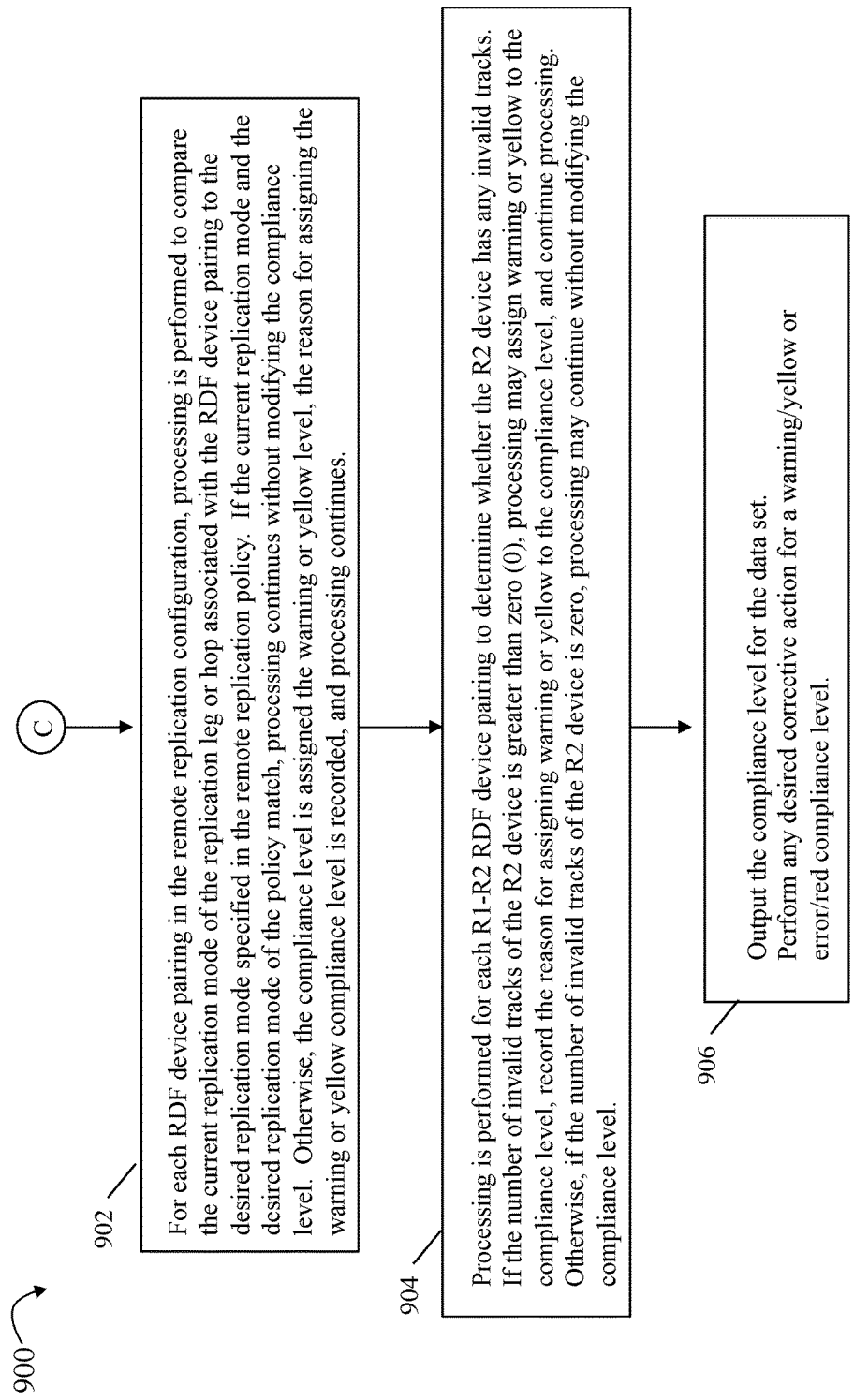

At the step 806, The device state of the R2 device of each RDF device pairing in the remote replication configuration is examined. If the remote replication configuration includes the R1-R2 device pairing configured in an active-active configuration and the R2 device of the pairing is ready with respect to the host (where the host can issue I/Os to the R2 device), then processing continues without modifying the compliance level. Otherwise, if the R2 device of the pair is configured on a passive path and is not accessible to the host for I/Os and the R2 device state is not ready or write disabled with respect to the host, then processing continues without modifying the compliance level. Otherwise if the R2 device state is ready with respect to the host and the path between the R2 device and the host is configured as passive where the R2 device is inaccessible to the host over the path, then processing assigns the compliance level of warning or yellow, records the reason for assigning the compliance level of warning or yellow, and continues with subsequent processing. From the step 806, control proceeds to the step 902 of the flowchart 900 of FIG. 13.

At the step 902, for each RDF device pairing in the remote replication configuration, processing is performed to compare the current replication mode of the replication leg or hop associated with the RDF device pairing to the desired replication mode specified in the remote replication policy. If the current replication mode and the desired replication mode of the policy match, processing continues without modifying the compliance level. Otherwise, the compliance level is assigned the warning or yellow level, the reason for assigning the warning or yellow compliance level is recorded, and processing continues. From the step 902, control proceeds to the step 904.

At the step 904, processing is performed for each R1-R2 RDF device pairing to determine whether the R2 device has any invalid tracks. If the number of invalid tracks of the R2 device is greater than zero (0), processing may assign warning or yellow to the compliance level, record the reason for assigning warning or yellow to the compliance level, and continue processing. Otherwise, if the number of invalid tracks of the R2 device is zero, processing may continue without modifying the compliance level. From the step 904, control proceeds to the step 906. At the step 906, the compliance level for the data may be output. The step 906 may include performing any desired corrective action for a warning/yellow or error/red compliance level.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of determining a compliance level comprising:
receiving a remote replication policy for a data set;
determining a current remote replication configuration of the data set; and
performing evaluation processing that determines, in accordance with the remote replication policy for the data set, the compliance level for remote replication of the data set, wherein said evaluation processing includes verifying that the topology of the current remote replication configuration for the data set matches a specified topology of the remote replication policy for the data set.

2. The method of claim 1, wherein the current remote replication configuration for the data set includes a plurality of hops, wherein each of the plurality of hops is between a pair of data storage systems, wherein the evaluation processing includes verifying that each of the plurality of hops is associated with a replication group defining one or more device pairs, wherein a first of the plurality of hops is between a first data storage system and a second data storage system and the first hop is associated with a first replication group including a first plurality of device pairs and each device pair of the first plurality includes a first device on the first data storage system and a second device on the second data storage system, and wherein data of the first device is remotely replicated to the second device.

3. The method of claim 2, wherein the evaluation processing includes:
determining that at least one of the plurality of hops is not associated with a replication group; and
responsive to determining that at least one of the plurality of hops is not associated with a replication group, assigning the compliance level a value of error denoting a level of non-compliance.

4. The method of claim 3, wherein the evaluation processing includes checking a plurality of properties of each replication group in the current remote replication configuration of the data set to ensure that the plurality of properties have a plurality of specified values.

5. The method of claim 4, wherein the plurality of properties of said each replication group includes a first property denoting whether said each replication group is offline, and includes a second property denoting whether data is currently not being transmitted over one of the plurality of hops associated with said each replication group, and wherein the evaluation processing includes:
determining whether the first property of said each replication group is offline; and
responsive to determining the first property of said each replication group is offline, assigning the compliance level the value of error denoting a level of non-compliance.

6. The method of claim 5, wherein the evaluation processing includes:

determining whether the second property of said each replication group indicates that data is currently not being transmitted over one of the plurality of hops associated with said each replication group; and
responsive to determining the second property of said each replication group indicates that data is currently not being transmitted over one of the plurality of hops associated with said each replication group, assigning the compliance level the value of error denoting a level of non-compliance.

7. The method of claim 6, wherein the plurality of properties includes a third property and wherein the evaluation processing includes:
determining whether the third property of said each replication group indicates that said each replication group is currently configured for asynchronous remote replication and determining whether active spillover of replication data is detected for said each replication group; and
responsive to determining that the third property of said each replication group indicates said each replication group configured for asynchronous remote replication and that active spillover of replication data is detected for said each replication group, assigning the compliance level a value of warning denoting a level of non-compliance less severe than the value of error.

8. The method of claim 7, wherein the plurality of properties of said each replication group includes a fourth property, wherein said each replication group is associated with one of the plurality of hops between a first pair of data storage systems, and wherein the evaluation processing includes:
determining whether at least the fourth property indicates that two or more ports of each data storage system of the first pair is used to provide remote replication services to said each replication group; and
responsive to determining at least the fourth property indicates that two or more ports of each data storage system of the first pair are not used to provide remote replication services to said each replication group, assigning the compliance level the value of warning denoting a level of non-compliance less severe than the value of error.

9. The method of claim 8, wherein the evaluation processing includes:
determining whether the third property of said each replication group indicates that said each replication group is currently configured for asynchronous remote replication and determining whether an observed maximum cycle time for said each replication group exceeds a threshold included in a corresponding remote replication policy associated with said each replication group; and
responsive to determining that the third property of said each replication group indicates said each replication group configured for asynchronous remote replication and that the observed maximum cycle time for said each replication group exceeds the threshold included in the corresponding remote replication policy associated with said each replication group, assigning the compliance level the value of warning denoting a level of non-compliance less severe than the value of error.

10. The method of claim 1, wherein said evaluation processing includes:
determining whether all devices of the data set are remotely replicated; and if all the devices of the data set are not remotely replicated, assigning the compliance level the value of error denoting a level of non-compliance.

11. The method of claim 10, wherein the evaluation processing includes:
determining whether all devices of the data set are included in a same replication group and all devices of the data set are configured to have the same remote replication mode; and
responsive to determining that not all the device are included in the same replication group or nor all devices are configured as having the same remote replication mode, assigning the compliance level the value of error denoting a level of non-compliance.

12. The method of claim 1, wherein the data set includes a plurality of devices, and wherein the evaluation processing includes:
determining whether each device of the data set has a same number of remote replicas at a same set of remote data storage systems; and
responsive to determining each device of the data set does not have a same number of remote replicas at a same set of remote data storage systems, assigning the compliance level the value of error denoting a level of non-compliance.

13. The method of claim 1, wherein the current remote replication configuration of the data set includes a plurality of device replication pairs, wherein each of the device replication pairs includes an R1 device located on a first data storage system and an R2 device located on a second data storage system, and wherein data for remote replication for said each device replication pair is configured to be transmitted over a first link between the first data storage system and the second data storage system.

14. The method of claim 13, wherein the evaluation processing includes:
updating the compliance level in accordance with a plurality of device replication pair states for the plurality of device replication pairs.

15. The method of claim 14, wherein for one of the plurality of device replication pairs, data is transmitted from a source system including the R1 device of said one device replication pair to a target system including the R2 device of said one device replication pair, wherein the R2 device of said one device replication pair is not synchronized with respect to content on the R1 device of said one device replication pair, and wherein said updating assigns the compliance level the value of warning.

16. The method of claim 14, wherein said evaluation processing includes:
determining that one of the plurality of device replication pairs, that is associated with one replication hop or leg of the current remote replication configuration of the data set, has a first remote replication mode;
determining that the remote replication policy specifies that the one replication hop or leg should have a second remote replication mode that is different from the first remote replication mode; and
responsive to determining that the remote replication policy specifies that the one replication hop or leg should have the second remote replication mode that is different from the first remote replication mode, assigning the value of warning to the compliance level.

17. A system comprising:
one or more processors; and a memory comprising code stored thereon that, when executed, performs a method of determining a compliance level comprising:

receiving a remote replication policy for a data set;

determining a current remote replication configuration of the data set; and performing evaluation processing that determines, in accordance with the remote replication policy for the data set, the compliance level for remote replication of the data set, wherein said evaluation processing includes verifying that the topology of the current remote replication configuration for the data set matches a specified topology of the remote replication policy for the data set.

18. A computer readable memory comprising code stored thereon that, when executed, performs a method of determining a compliance level comprising:

receiving a remote replication policy for a data set;

determining a current remote replication configuration of the data set; and performing evaluation processing that determines, in accordance with the remote replication policy for the data set, the compliance level for remote replication of the data set, wherein said evaluation processing includes verifying that the topology of the current remote replication configuration for the data set matches a specified topology of the remote replication policy for the data set.

* * * * *